United States Patent

Muljadi et al.

[11] Patent Number: 5,747,967
[45] Date of Patent: May 5, 1998

[54] APPARATUS AND METHOD FOR MAXIMIZING POWER DELIVERED BY A PHOTOVOLTAIC ARRAY

[75] Inventors: Eduard Muljadi; Roger W. Taylor, both of Golden, Colo.

[73] Assignee: Midwest Research Institute, Kansas City, Mo.

[21] Appl. No.: 605,351

[22] Filed: Feb. 22, 1996

[51] Int. Cl.[6] .......................... H01M 10/46; H01M 10/44
[52] U.S. Cl. ................... 320/39; 320/61; 136/293
[58] Field of Search .................. 320/5, 9, 10, 11, 320/12, 13, 29, 30, 39, 61; 323/906; 136/243, 293

[56] References Cited

U.S. PATENT DOCUMENTS

| | | | |
|---|---|---|---|
| 4,272,806 | 6/1981 | Metzger | 363/21 |
| 4,375,662 | 3/1983 | Baker | 363/95 |
| 4,390,940 | 6/1983 | Corbefin et al. | 363/132 |
| 4,404,472 | 9/1983 | Steigerwald | 307/46 |
| 4,494,180 | 1/1985 | Streater et al. | 363/37 |
| 4,510,434 | 4/1985 | Assbeck et al. | 323/237 |
| 4,916,382 | 4/1990 | Kent | 323/299 |
| 5,025,202 | 6/1991 | Ishii et al. | 320/32 |

*Primary Examiner*—Edward Tso
*Attorney, Agent, or Firm*—Edna M. O'Connor; Ken Richardson

[57] ABSTRACT

A method and apparatus for maximizing the electric power output of a photovoltaic array connected to a battery where the voltage across the photovoltaic array is adjusted through a range of voltages to find the voltage across the photovoltaic array that maximizes the electric power generated by the photovoltaic array and then is held constant for a period of time. After the period of time has elapsed, the electric voltage across the photovoltaic array is again adjusted through a range of voltages and the process is repeated. The electric energy and the electric power generated by the photovoltaic array is delivered to the battery which stores the electric energy and the electric power for later delivery to a load.

48 Claims, 17 Drawing Sheets

APPARATUS AND METHOD FOR MAXIMIZING POWER DELIVERED BY A PHOTOVOLTAIC ARRAY

The United States Government has rights in this invention under Contract No. DE-AC36-83CH10093 between the U.S. Department of Energy and the National Renewable Energy Laboratory, a Division of Midwest Research Institute.

BACKGROUND OF THE INVENTION

1. Field of the Invention

This invention relates generally to a method and apparatus for generating electric power from a photovoltaic array and, more particularly, to a method and apparatus that maximizes power output of a photovoltaic array during varying ambient weather conditions and delivers the generated electric power to a battery.

2. Description of the Prior Art

In recent years, the use of solar energy has become an increasingly important source of energy and the availability and efficiency of photovoltaic cells and photovoltaic arrays, which convert solar energy into electrical energy, has steadily increased. The power generating capabilities of photovoltaic cells and photovoltaic arrays rely heavily on ambient conditions. In particular, the amount of solar radiation incident on the photovoltaic cells and photovoltaic arrays, which varies as a function of weather, clouds, time of year, and other meteorologic conditions, and the ambient temperature affect the amount of electrical energy that can be generated by the photovoltaic cells or photovoltaic arrays.

In a typical and common application of a photovoltaic array, the photovoltaic array is used to supply electric energy and electric power directly to a load. While this configuration is adequate for daylight operation, the photovoltaic array may cease to provide electric energy and electric power during periods of darkness or periods of reduced incident solar radiation. Therefore, many photovoltaic array configurations include a battery that is charged by the photovoltaic array during periods of incident solar radiation. The energy stored in the battery can then be used to supply electric energy and electric power to a load during periods of darkness or periods of reduced incident solar radiation. This in turn causes the battery to discharge. With this type of configuration, therefore, the photovoltaic array and the battery act together to keep the load continuously supplied with electric energy and electric power and the battery is alternately charged and discharged.

For a given temperature of the photovoltaic cell or photovoltaic array and a given amount of solar radiation incident on the photovoltaic cell or photovoltaic array, there is a curve relating the voltage across the photovoltaic cell or photovoltaic array with electric current flowing through the photovoltaic cell or photovoltaic array. Thus, there is a family of voltage/current curves for a given photovoltaic cell or photovoltaic array and varying weather conditions can create variations in the amount of electric power generated by the photovoltaic cells and photovoltaic arrays.

In order to most efficiently use the electrical power generated by a photovoltaic cell or photovoltaic array, it is desirable to maximize the power generated by the photovoltaic cell or photovoltaic array, despite varying weather conditions. Maximizing the power generated by a photovoltaic cell or photovoltaic array requires the determination of the optimal operating conditions for the photovoltaic cell or photovoltaic array for the given weather conditions, i.e., it is necessary to find the operating point on the voltage-versus-current curve for the photovoltaic cell or photovoltaic array that maximizes the power output from the photovoltaic cell or photovoltaic array. In addition, a generator system incorporating a photovoltaic cell or photovoltaic array must be able to determine optimal operating parameters for the generator system for varying temperatures and varying amounts of solar radiation incident on the photovoltaic cell or photovoltaic array.

There have been myriad methods and structures proposed and used for the purpose of supplying electric energy and electric power generated by a photovoltaic array or photovoltaic cell to a battery or load. For example, U.S. Pat. No. 4,510,434 issued to Assbeck et al., U.S. Pat. No. 4,494,180 issued to Streater et al., U.S. Pat. No. 4,404,472 issued to Steigerwald, and U.S. Pat. No. 4,375,662 issued to Baker disclose such systems. In Assbeck et al., the automatic setting of the optimum operating point of a DC voltage source involves changing the duty cycle of a switch in a DC chopper to create variations in the measured voltage of the DC voltage source and changing the duty cycle accordingly until the optimal operating point is reached. The apparatus disclosed in Assbeck et al., however, requires the monitoring of both the electric voltage and current produced by the solar generator, which increases the complexity of the disclosed apparatus. In Streater et al., a load is matched to a source so that optimal operating conditions are obtained. Therefore, the load must remain electrically connected to the system at all times. Furthermore, the system disclosed in Streater et al. requires the monitoring of both the electric voltage and the current produced by the solar array, which increases the complexity of the disclosed system. In Baker, the DC electric power supplied by a photovoltaic solar panel to a load is controlled by incrementally changing the panel load and monitoring the slope of the panel voltage versus current characteristic and adjusting the current supplied by the panel to the load so that the slope is approximately unity. The control disclosed in Steigerwald uses a DC-to-AC inverter or DC-to-DC converter to create a commanded electric current for a solar array which is compared to the resulting measured electric current from the solar array. The difference between the two signals controls the electric current and the power drawn from the solar array.

Each of the disclosed systems also continuously search for the operating conditions that maximize the power output of the photovoltaic cell or photovoltaic array. Once the optimal operating conditions have been determined, the systems intentionally change the operating conditions to non-optimal operating conditions and restart the process of determining the optimal operating conditions. Therefore, the disclosed systems do not provide for extended or sustained operation at the optimal operating conditions once the optimal operating conditions have been determined, which causes a loss in efficiency of the disclosed systems and reduces the power delivered by the photovoltaic device to a battery or load. Consequently, in spite of the well-developed state of solar array and photovoltaic array technology, there is still a need for a peak power tracker for a photovoltaic array that is simple to construct, operates the photovoltaic array at peak power output for significant periods of time, and allows the electric energy and electric power produced by the photovoltaic array to be stored in a battery.

SUMMARY OF THE INVENTION

Accordingly, it is a general object of this invention to provide a generator system incorporating a photovoltaic cell or photovoltaic array that generates an optimum level of electric power during varying weather conditions.

It is another general object of this invention to provide a generator system incorporating a photovoltaic cell or photovoltaic array to deliver generated energy and power to a battery in order to charge the battery.

It is another general object of this invention to provide a generator system incorporating a photovoltaic cell or photovoltaic array that stabilizes the power and the voltage delivered to a battery.

It is a further general object of this invention to provide a generator system incorporating a photovoltaic cell or photovoltaic array that periodically searches for the optimal operating parameters for the generator system and temporarily latches the operating parameters of the generator system once the optimal operating parameters have been determined.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the apparatus of the present invention includes a photovoltaic array for generating electric energy and electric power; a battery for storing the electric energy and electric power generated by the photovoltaic array and for delivering the stored electric energy and electric power to a load; a boost converter electrically connected between the photovoltaic array and the battery to electrically connect and disconnect (the electric coupling) the photovoltaic array to the battery; a peak current finder for periodically determining the maximum electric current flowing through the battery when the photovoltaic array is connected to the battery and signaling the determination of the peak battery current to a firing circuit; and the firing circuit for controlling the operation of the boost converter, the operating condition of the generator system, and the amount of electric power generated by the photovoltaic array.

To further achieve the foregoing and other objects, the present invention further comprises a method of periodically varying the electric voltage generated by the photovoltaic array until the electric power generated by the photovoltaic array and the related electric current flowing through the battery are at a maximum; latching or fixing for a period of time the voltage of the photovoltaic array at the value producing the maximum electric power generated by the photovoltaic array and the maximum electric current flowing through the battery; repeating the process continuously after the period of time has elapsed.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings

DETAILED DESCRIPTION OF THE PREFERRED EMBODIMENTS

Figure 1:
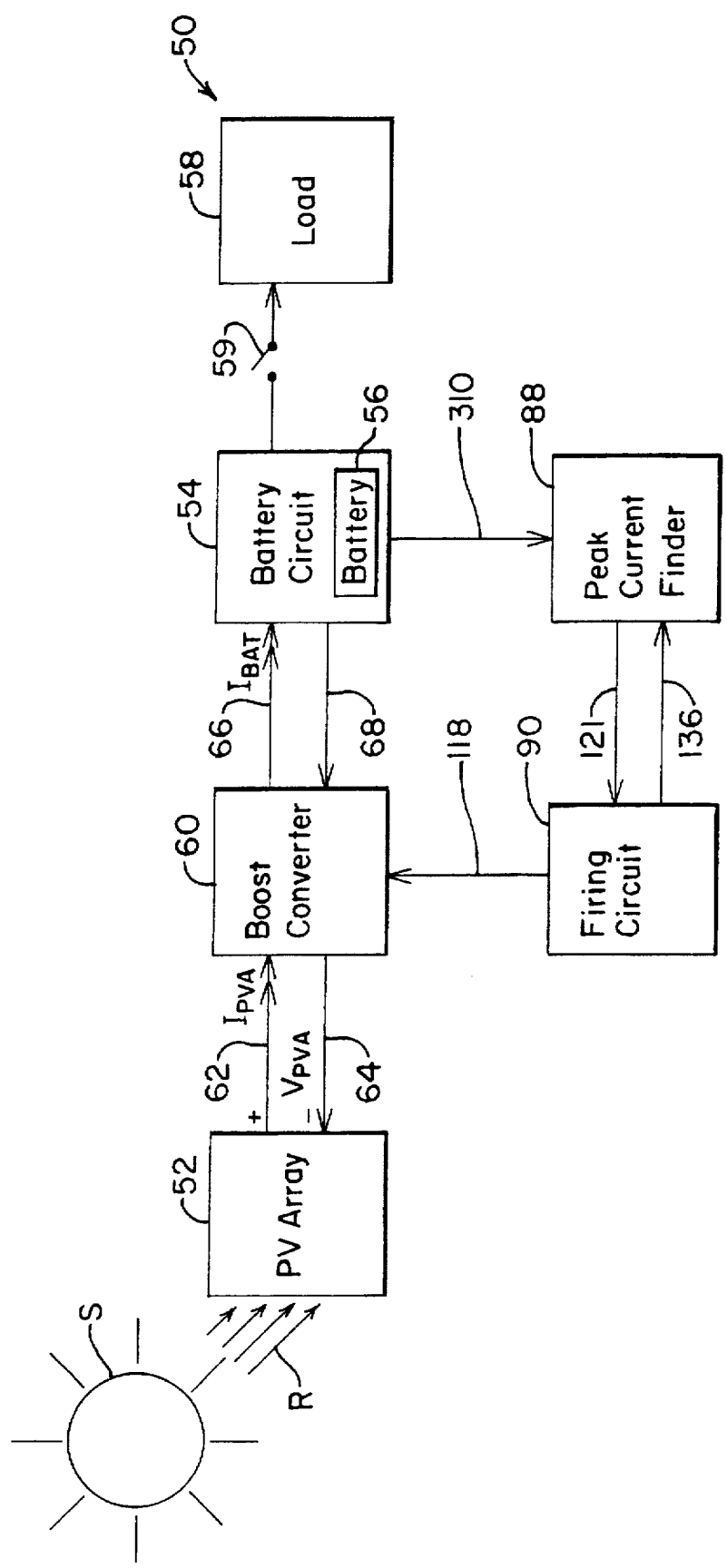
FIG. 1 shows a functional block diagram of the operative components and electronic circuitry of the generator system of the present invention.

The generator system 50 of this invention, as illustrated in the functional block diagram of FIG. 1, includes a photovoltaic array or photovoltaic cell 52 for receiving solar energy from solar radiation R from the sun S that is incident on the photovoltaic array 52 and converting the solar energy to electric energy and electric power $P_{PVA}$. The generator system 50 also includes a battery circuit 54 having a battery 56 that is charged by the electric energy and electric power $P_{PVA}$ generated by the photovoltaic array 52 during a charging period. The battery 56 can then be used to provide electric energy and power to a load 58 during a discharging period wherein the energy stored in the battery 56 is delivered to the load 58, thereby partially or completely discharging the battery 56. The charging and discharging periods alternate so that the battery 56 is alternately charged by electrical connection to the photovoltaic array 52 and discharged by electrical connection to the load 58. The switch 59 controls the electrical connection between the battery circuit 54 and the load 58. The boost converter 60 controls the electrical connection or coupling between the photovoltaic array 52 and the battery circuit 54.

The photovoltaic array 52 can be formed of a single solar cell or a plurality of discrete solar cells (not shown). Essentially, the photovoltaic array 52 absorbs the solar energy from the solar radiation R, produces DC electric current $I_{PVA}$ that flows out of the photovoltaic array 52 on the lead 62, and produces DC electric voltage $V_{PVA}$ across the photovoltaic array 52 between the leads 62, 64, thereby producing electric energy and electric power $P_{PVA}$. This in turn produces a current $I_{BAT}$ that flows through the battery circuit 54 on the leads 66, 68 and charges the battery 56 during the charging period. The lead 62 is the positive terminal of the photovoltaic array 52 while the lead 64 is the negative terminal of the photovoltaic array 52. The lead 66 is the positive terminal of the battery circuit 54 while the lead 68 is the negative terminal of the battery circuit 54.

The purpose of this invention is to enable efficient and optimal production of electric energy and electric power $P_{PVA}$ from the photovoltaic array 52 under varying weather conditions and to deliver the generated power $P_{PVA}$ from the photovoltaic array 52 to the battery circuit 54 in order to charge the battery 56 during a charging period. More specifically, it is the purpose of this invention to allow the generator system 50 to continuously produce a voltage $V_{PVA}$ across the photovoltaic array 52 and a current $I_{PVA}$ flowing out of the photovoltaic array 52 during the charging period so that the photovoltaic array 52 is generating an optimal amount of electric energy and electric power $P_{PVA}$ during the charging period. The generator system 50 will periodically determine and set the optimal voltage $V_{VPA}$ across the photovoltaic array 52 and, as a result, the optimal current $I_{PVA}$ flowing out of the photovoltaic array 52 so that the photovoltaic array 52 is continuously producing a maximum amount of electric power $P_{PVA}$ during the charging period.

Figure 2:
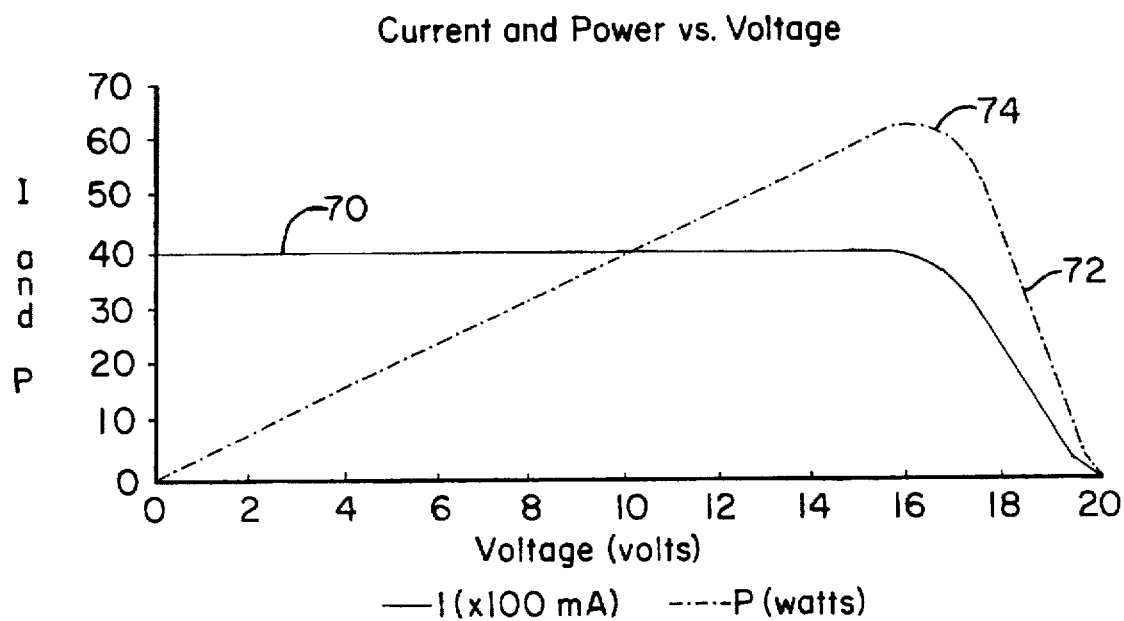
FIG. 2 shows the voltage-versus-current characteristics and the resulting power for a typical photovoltaic array used in the generator system of in FIG. 1.
Figure 3:
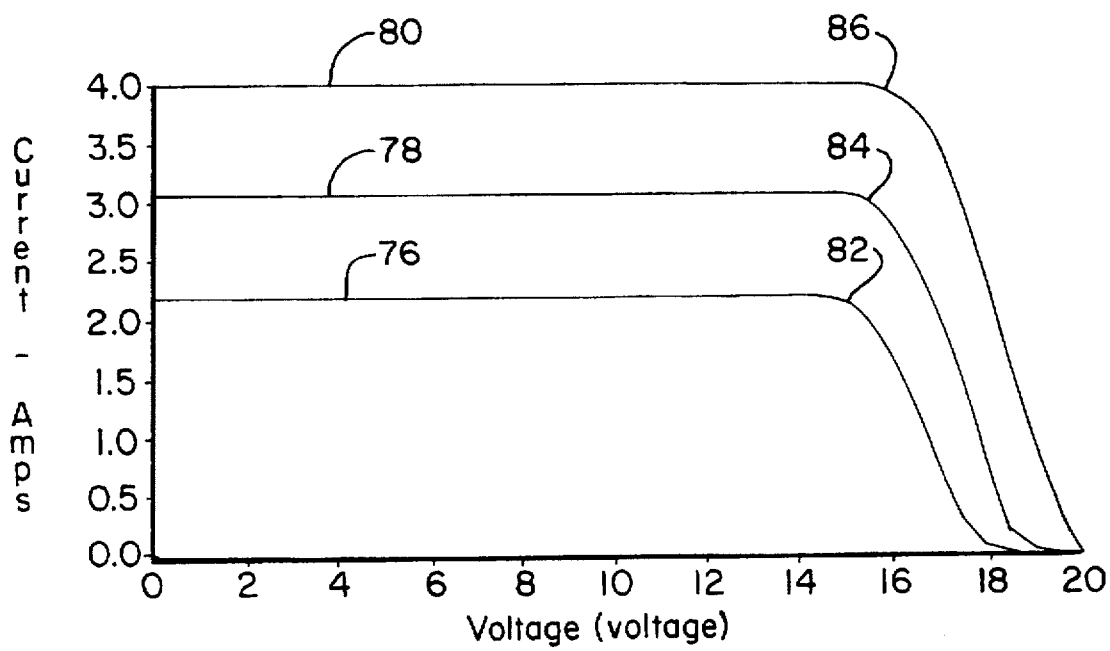
FIG. 3 shows a family of voltage-versus-current curves for varying weather conditions for a typical photovoltaic array used in the generator system of FIG. 1.

An important aspect of the generator system 50 of the present invention is that optimal electric power $P_{PVA}$ is continuously generated by the photovoltaic array 52 during the charging period, despite varying weather conditions. A typical photovoltaic array 52 has a voltage-versus-current curve 70 and a resulting power curve 72, as shown in FIG. 2. The power $P_{PVA}$ generated by the photovoltaic array 52 is equal to the voltage $V_{PVA}$ across the photovoltaic array 52 multiplied by the current $I_{PVA}$ flowing out of the photovoltaic array 52 on the lead 62 and results in the power curve 72. The maximum power point 74 is the point on the power curve 70 where the photovoltaic array 52 is producing the maximum electric power. Now referring to FIG. 3, a family of curves 76, 78, 80 is possible for the photovoltaic array 52, each of the curves 76, 78, 80 representing the operating characteristics of the photovoltaic array 52 for a different set of ambient weather conditions. There is, potentially, an infinite number of voltage-versus-current curves for the photovoltaic array 52, of which the curves 76, 78, 80 are examples. Each of the curves 76, 78, 80 also has a maximum power point 82, 84, 86, respectively, which represents the optimal operating point for the photovoltaic array 52 for the specific voltage-versus-current curve. As weather conditions change during the charging period, the temperature of the photovoltaic array 52 and the amount of solar radiation R incident on the photovoltaic array 52 will also change, thereby changing the operating characteristics of the photovoltaic array 52 and shifting the operation of the photovoltaic array 52 from one of the family of voltage-versus-current curves to another. Therefore, the generator system 50 will periodically redetermine and reset the voltage $V_{PVA}$ across the photovoltaic array 52 and, as a result, the current $I_{PVA}$ flowing out of the photovoltaic array 52, so that the photovoltaic array 52 continuously generates optimal levels of electric energy and electric power $P_{PVA}$ for the varying weather conditions during the charging period.

The principal components used in the generator system 50 according to this invention for operating the photovoltaic array 52 so that generator system 50 delivers maximum electric power to the battery 56 during a charging period include the photovoltaic array 52 to generate electric energy and electric power $P_{PVA}$, the boost converter 60 for delivering the electric energy and electric power $P_{PVA}$ generated by the photovoltaic array 52 to the battery 56 and for varying and setting the level of the voltage $V_{PVA}$ and electric current $I_{PVA}$ so that the photovoltaic array 52 is generating a peak amount of electric energy and electric power, the battery circuit 54 which contains the battery 56 that is charged by the electric energy and electric power generated by the photovoltaic array 52 during the charging period, the peak current finder 88 for determining when the electric current $I_{BAT}$ and hence the electric power $P_{PVA}$ generated by the photovoltaic array 52 are at a maximum, and the firing circuit 90 for controlling the operation of the boost converter 60 and for controlling the electrical connection between the photovoltaic array 52 and the battery circuit 54. The boost converter 60 is the interface between the photovoltaic array 52 and the battery circuit 54. The input signal to the boost converter 60 is from the photovoltaic array 52 on the lead 62 and the output signal from the boost converter 60 is connected to the battery circuit 54 on the lead 66.

A significant feature of this invention is that the duty cycle of the boost converter 60 is varied periodically during a time period $T_{VARY}$ by the firing circuit 90 which opens and closes and otherwise controls a switch 92 (shown in FIG. 4) in the boost converter 60 that electrically connects and disconnects the photovoltaic array 52 with the battery circuit 54 during the time period $T_{VARY}$, thereby causing the DC voltage $V_{PVA}$ and the DC electric currents $I_{PVA}$ and $I_{BAT}$ to vary also during the time period $T_{VARY}$. The duty cycle of the boost converter 60 is equal to the ratio of the time the photovoltaic array 52 is electrically connected to the battery circuit 54 to a fixed and constant time period $T_p$, as will be discussed in more detail below. The duty cycle of the boost converter 60 is varied until the DC electric current $I_{BAT}$ flowing through the battery circuit 54 is determined by the peak current finder 88 to be at its maximum. When the electric current $I_{BAT}$ flowing through the battery circuit 54 is at a maximum, the electric power $P_{PVA}$ being generated by the photovoltaic array 52 is also at a maximum, as will be discussed in more detail below. After the peak current finder 88 has determined that the electric current $I_{BAT}$ is at a maximum, the duty cycle of the boost converter 60 is held constant for a period of time $T_{FIX}$ to keep the DC voltage $V_{PVA}$ and the DC electric current $I_{PVA}$ constant and to keep the electric power $P_{PVA}$ generated by the photovoltaic array 52 and the electric current $I_{BAT}$ flowing through the battery circuit 54 at their maximum levels during the time period $T_{FIX}$. After the period of time $T_{FIX}$ has elapsed, the duty cycle of the boost converter 60, the electric current $I_{BAT}$, and the electric power $P_{PVA}$ are again allowed to vary during a time period $T_{VARY}$ until the maximum levels of the electric current $I_{BAT}$ flowing through the battery circuit 54 and the electric power $P_{PVA}$ generated by the photovoltaic array 52 are determined again by the peak current finder 88. This alternating process repeats continuously during the entire charging period.

Varying the duty cycle of the boost converter 60 during the time period $T_{VARY}$ varies the relationship between the input signals to the boost converter 60 during the output signals from the boost converter 60, as will be discussed in more detail below. In addition, the duty cycle of the boost converter 60 controls the operation of the switch 92 and, as a result, the electrical connection between the photovoltaic array 52 and the battery circuit 54. When the switch 92 in the boost converter 60 is opened, electric current from the photovoltaic array 52 flows through the battery circuit 54. When the switch 92 in the boost converter 60 is closed, electric current from the photovoltaic array 52 is diverted to that it does not flow through the battery circuit 54.

At the beginning of the charging period, the battery 56 is working at its specification. That is, the battery 56 has been discharged to its final voltage as a result of being connected to the load 58 during the discharging period. For purposes of explanation of the generator system 50, a twenty-four volt battery having a specification voltage of approximately twenty volts will be used for the battery 56. Therefore, at the end of the charging period, the battery 56 will have a voltage $V_{BAT}$ of approximately twenty-four volts. At the start of the charging period, the battery 56 will have a voltage $V_{BAT}$ of approximately twenty volts. Since the instantaneous change in the battery 56 voltage $V_{BAT}$ during the charging period is extremely small, the battery 56 voltage can be assumed to have a constant voltage during each variation of the duty cycle during the time period $T_{VARY}$ and during each time period $T_{FIX}$, as will be discussed in more detail below. Since the battery 56 is charging during the charging period, however, the battery 56 voltage $V_{BAT}$ is, in fact, continuously increasing during the charging period until it reaches a voltage $V_{BAT}$ of approximately twenty-four volts.

Since the battery 56 has essentially a constant voltage during each time period $T_{VARY}$ and during each time period $T_{FIX}$, varying the duty cycle of the boost converter 60 during the time period $T_{VARY}$ will vary the input voltage of the boost converter 60 which is equal to the output voltage $V_{PVA}$ of the photovoltaic array 52. As a result, varying the duty cycle of the boost converter 60 will vary the output voltage $V_{PVA}$ of the photovoltaic array 52 and will vary the amount of DC electric current $I_{BAT}$ flowing through the battery 56. The DC electric current $I_{BAT}$ flowing through the battery circuit 54 is related to output voltage $V_{PVA}$ of the photovoltaic array 52 such that when the photovoltaic array 52 is producing its optimal voltage (which corresponds to maximum power), the electric current $I_{BAT}$ flowing through the battery 56 is maximized, as will be discussed in more detail below. Once the maximum electric current flowing through the battery 56 has been reached, the firing circuit 90 will stop varying the duty cycle of the boost converter 60 for the time period $T_{FIX}$ to keep the photovoltaic array 52 operating at its peak power output during the time period $T_{FIX}$. After the firing circuit 90 of the period of time $T_{FIX}$ has expired, the duty cycle of the boost converter 60 is allowed to vary again for a time period $T_{VARY}$. This process is repeated over and over again during the charging period.

Figure 4:
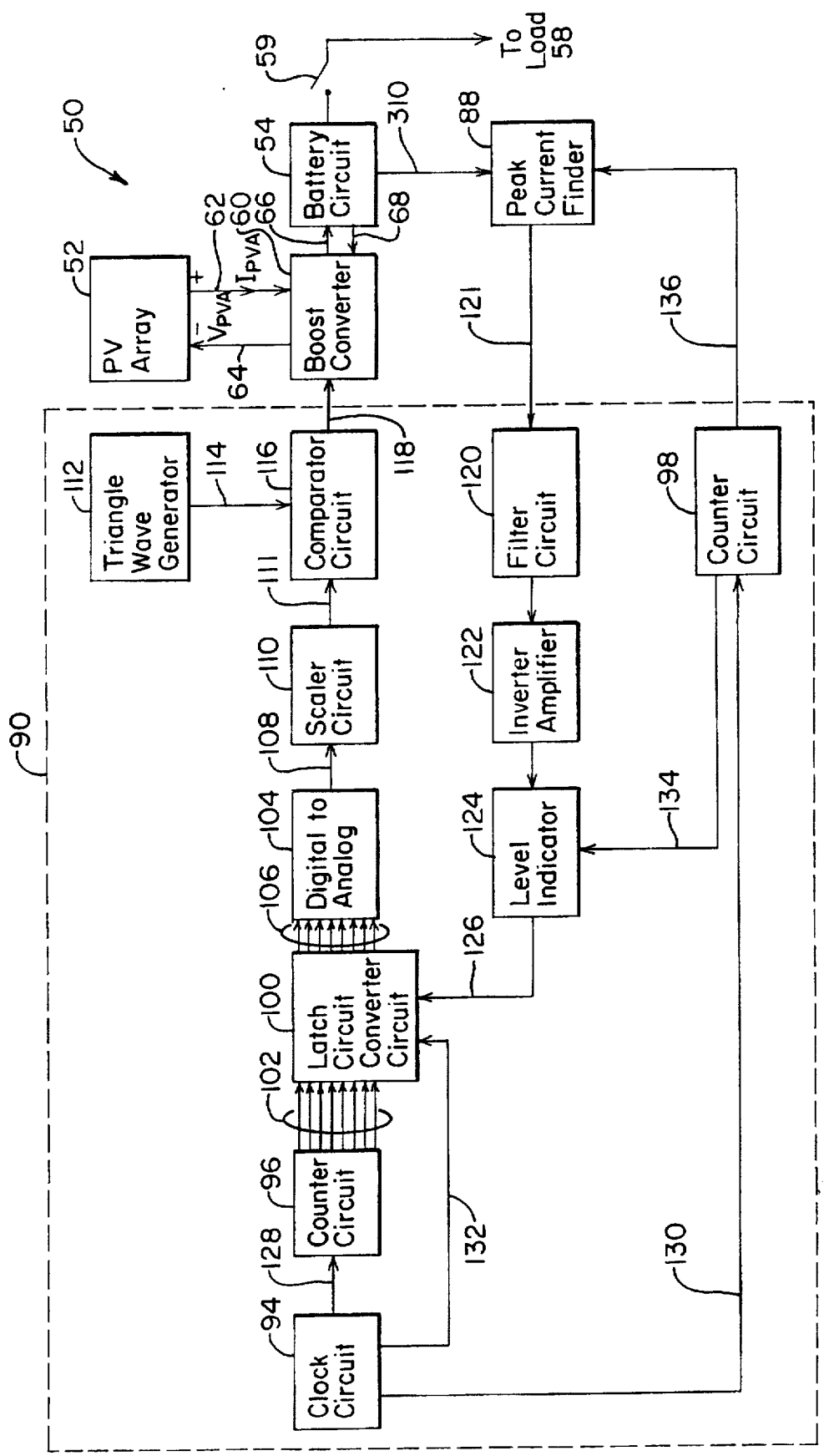
FIG. 4 shows more detailed functional block diagram of the operative components of the firing circuit of the generator system of FIG. 1.

Now referring to FIG. 4, the functional block diagram for the generator system 50 is shown in more detail. The firing circuit 90 includes the clock circuit 94 for providing timing and reset signals to the counter circuits 96, 98 and to the latch circuit 100, the counter circuit 96 for providing digital voltage signals on the leads 102a–102h representing an eight-bit binary number between zero (0) and 255, the counter circuit 98 for resetting the peak current finder 88, the latch circuit 100 for temporarily latching the output voltage signals from the counter circuit 96 on the leads 102a–102h, the digital-to-analog converter circuit 104 for converting the eight-bit binary number represented by the digital voltage signals on the eight leads 106a–106h to a linearly related analog voltage signal on the lead 108, the scaler circuit 110 for adding a DC bias voltage signal to the output voltage signal from the digital-to-analog converter circuit 104 on the lead 108 and creating a output voltage signal on the lead 111, the triangle wave generator 112 for creating a triangle shaped voltage signal on the lead 114 that is an input signal to the comparator circuit 116, the comparator circuit 116 for comparing the voltage signals from the triangle wave generator 112 and the scaler circuit 110 and creating a voltage signal on the lead 118 that controls the operation of the boost converter 60, the filter circuit 120 for smoothing the output signal from the peak current finder 88 on the lead 121, and the inverting amplifier 122 and the level indicator 124 for creating a digital voltage input signal to the latch circuit 100 on the lead 126.

When the generator system 50 becomes operational, the photovoltaic array 52 creates a DC voltage $V_{PVA}$ across the leads 62, 64 connected between the photovoltaic array 52 and the boost converter 60. In addition, a DC electric current $I_{PVA}$ flows out of the photovoltaic array 52 on the lead 62 into the boost converter 60 and an identical DC electric current flows out of the boost converter 52 on the lead 64 and into the photovoltaic array 52. The relationship between the voltage $V_{PVA}$ and the electric current $I_{PVA}$ is governed by a voltage-versus-current curve such as the curves shown in FIGS. 2 and 3 and the ambient weather conditions. The electric power $P_{PVA}$ produced by the photovoltaic array is equal to DC voltage $V_{PVA}$ multiplied by the electric current $I_{PVA}$.

The operation of the boost converter 60 is controlled by the firing circuit 90. More specifically, when the firing circuit 90 opens the switch 92 in the boost converter 60, the photovoltaic array 52 is connected to the battery circuit 54. When the firing circuit 90 closes the switch 92 in the boost converter 60, the photovoltaic array 52 is not connected to the battery circuit 54. As previously discussed, the duty cycle of the boost converter 60 is equal to the ratio of the time $T_{CLOSE}$ the switch 92 in the boost converter 60 is closed to the sum of the time the switch 92 is closed $T_{CLOSE}$ and the time $T_{OPEN}$ the switch 92 is open in a given time period $T_p$ or, in other words, the duty cycle of the boost converter 60 is equal to the ratio of the time the photovoltaic array 52 is connected to the battery circuit 54 to the sum of the time the photovoltaic array 52 is connected to the battery circuit 54 and the time the photovoltaic array 52 is not connected to the battery circuit 54 in a given time period $T_p$. Thus:

$$\text{DutyCycle} = \frac{T_{CLOSE}}{T_P} \quad (1)$$

Figure 6:
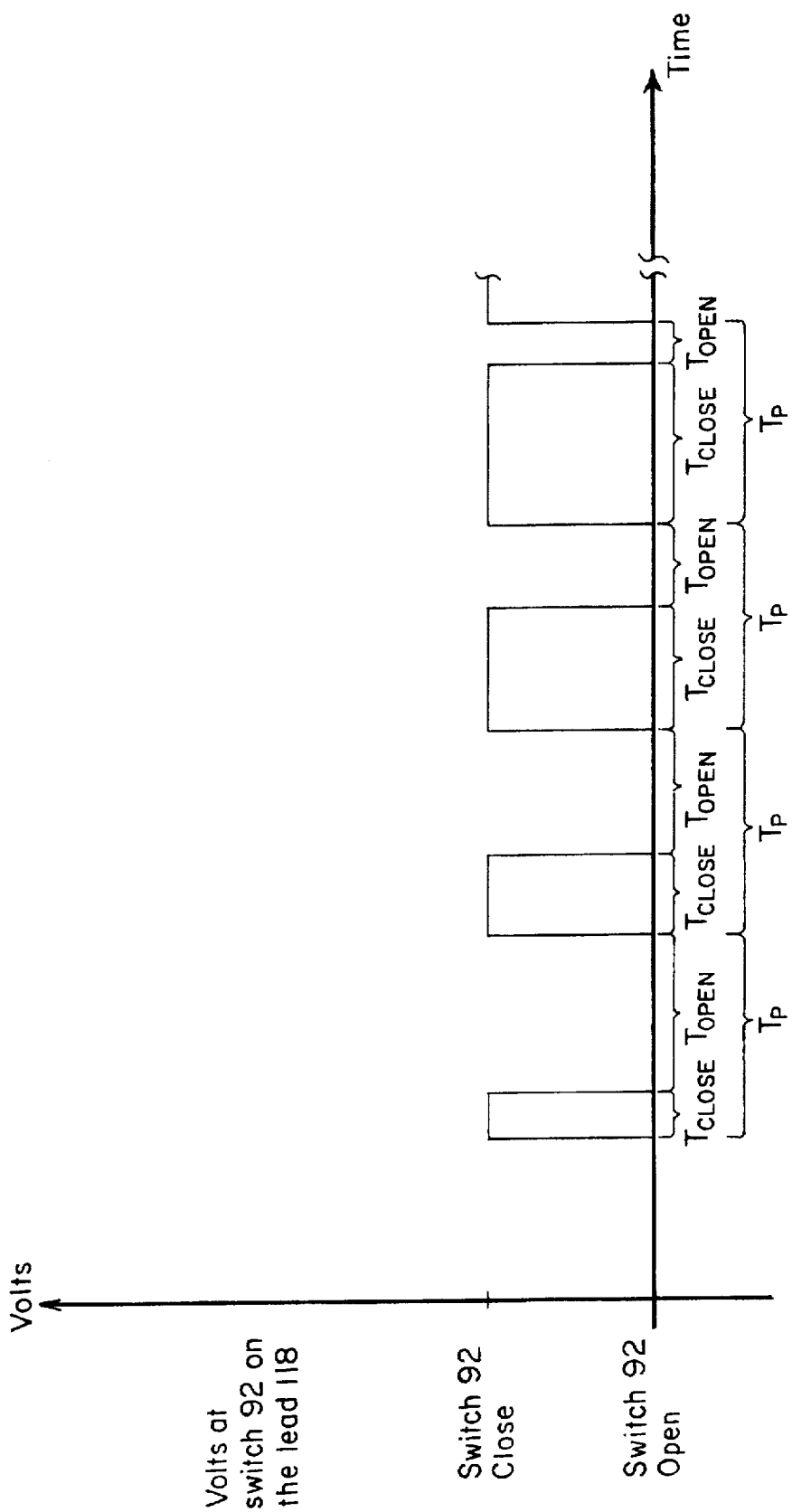
FIG. 6 shows the duty cycle of the boost converter of the generator system of FIG. 4.

The time period $T_p$ remains constant while $T_{CLOSE}$ and $T_{OPEN}$ will vary for each successive time period $T_p$ (see FIG. 6). In addition, $T_p$ is equal to $T_{CLOSE}$ plus $T_{OPEN}$ for each particular time period $T_p$. Therefore, varying the duty cycle during the time period $T_{VARY}$ will vary the amount of time switch 92 is opened and closed and the amount of time the photovoltaic array 52 is connected to the battery circuit 54 during successive time periods $T_p$.

The battery 56 has essentially a constant DC voltage $V_{BAT}$ during each time period $T_{VARY}$ and during each time period $T_{FIX}$. In addition, a DC electric current $I_{BAT}$ flows out of the boost converter 60 on the lead 66 and into the battery circuit 54 when the switch 92 is open during the time period $T_{OPEN}$ (i.e., when the photovoltaic array 52 is connected to the battery circuit 54). Likewise, a DC electric current $I_{BAT}$ will flow out of the battery circuit 54 on the lead 68 and into the boost converter 60 when the switch is open during the time period $T_{OPEN}$ (i.e., when the photovoltaic array 52 is connected to the battery circuit 54). Therefore, the electric power $P_{BAT}$ in the battery 56 is equal to the DC voltage $V_{BAT}$ multiplied by the DC electric current $I_{BAT}$ when the photovoltaic array 52 is connected to the battery circuit 54.

When the photovoltaic array 52 is connected to the power generated by approximately all of the power generated by the photovoltaic array 52 is delivered to battery 56. Therefore, the power $P_{PVA}$ generated by the photovoltaic array 52 is approximately equal to the power $P_{BAT}$, and $$P_{PVA} = P_{BAT} = V_{PVA} I_{PVA} = I_{BAT} \quad (2)$$

and $$I_{BAT} = \frac{P_{PVA}}{V_{BAT}} \quad (3)$$

Since the voltage $V_{BAT}$ across the battery is approximately constant during the time period $T_{VARY}$, the instantaneous electric power $P_{PVA}$ generated by the photovoltaic array 52 is maximized when the instantaneous electric current $I_{BAT}$ flowing through the battery 56 is maximized.

As will be discussed in more detail below, varying the duty cycle of the boost converter 60 during the time period $T_{VARY}$ will vary the amount of electric current $I_{BAT}$ flowing into the battery circuit 54 on the lead 66 in addition to varying the electric power $P_{PVA}$ output from the photovoltaic array 52. More specifically, the input voltage to the boost converter 60 is the output voltage $V_{PVA}$ from the photovoltaic array 52. The output voltage from the boost converter is the input voltage to the battery circuit 54 and is approximately equal to the voltage $V_{BAT}$ across the battery 56. Since the battery 56 has approximately a constant voltage $V_{BAT}$ during each time period $T_{VARY}$ and during each time period $T_{FIX}$, varying the duty cycle of the boost converter 60 will vary the input voltage to the boost converter 60 which is equal to the output voltage $V_{PVA}$ from the photovoltaic array 52. This in turn causes the electric current $I_{PVA}$ and the electric power $P_{PVA}$ to vary, as shown in the voltage-versus-current and power curves in FIG. 2. As a result, the electric current $I_{BAT}$ flowing through the battery 56 will also vary so that the relationship between the power $P_{PVA}$ generated by the photovoltaic array 52 and the power $P_{BAT}$ delivered to the battery 56 shown in equation (1) discussed above is maintained. Therefore, as shown in equation (2) discussed above, the electric power $P_{PVA}$ generated by the photovoltaic array 52 is maximized when the electric current $I_{BAT}$ flowing through the battery 56 is maximized.

The peak current finder 88 senses the electric current $I_{BAT}$ flowing in the battery 56 and detects when the electric current $I_{BAT}$ is at a maximum during the time period $T_{VARY}$. Once the peak current finder 88 has determined that the electric current $I_{BAT}$ is at a maximum during the time period $T_{VARY}$, the peak current finder 88 sends a voltage signal to the firing circuit 90 on the lead 121 that "latches" the duty cycle of the boost converter 60 so that duty cycle remains constant and no longer varies for a period of time $T_{FIX}$. Maintaining a constant duty cycle for the boost converter 60 during the time period $T_{FIX}$ maintains a constant output power $P_{PVA}$ from the photovoltaic array 52, so long as the weather conditions do not vary significantly while the duty cycle is held constant during the time period $T_{FIX}$. If it is assumed that the weather conditions remain approximately constant during the time period time $T_{FIX}$, the power output $P_{PVA}$ from the photovoltaic array 52 will remain maximized while the duty cycle for the boost converter 60 is held fixed during the time period $T_{FIX}$.

It must also be assumed, however, that the ambient weather conditions for the photovoltaic array 52 will not remain constant for too long during the charging period. In addition, the battery 56 voltage $V_{BAT}$ increases during the charging period. Therefore, it is necessary that the time periods $T_{VARY}$ and $T_{FIX}$ be short enough so that the voltage $V_{BAT}$ stays approximately constant and the ambient weather conditions stay approximately constant during each time period $T_{VARY}$ and during each time period $T_{FIX}$. In addition, it is necessary to restart the process of varying and latching the duty cycle of the boost converter 60 to redetermine the optimal operating parameters for the generator system 50. By periodically searching for the optimal operating parameters of the generator system 50 that maximize the power output $P_{PVA}$ from the photovoltaic array 52, and temporarily latching the operating parameters of the generator system 50 at the optimal settings, the efficiency of the generator system 50 is significantly increased, despite the problems created by varying ambient weather conditions.

As previously discussed above, the firing circuit 90 controls the duty cycle of the boost converter 60 which in turn controls the electrical connection between the photovoltaic array 52 and the battery circuit 54. The firing circuit 90 is driven by a clock circuit 94 that provides a periodic pulsed voltage timing signal to the counter circuits 96, 98 and the latch circuit 100 on the leads 128, 130, 132, respectively, to control the variations in the duty cycle of the boost converter 60 and the periodic restarting of the search for the optimal operating parameters for the generator system 50.

The counter circuit 96 receives the periodic pulsed voltage timing signal from the clock circuit 94 on the lead 128 and creates digital output voltage signals on the eight leads 102a–102h electrically connected between the counter circuit 96 and the latch circuit 100. Essentially, the counter circuit 96 creates digital voltage signals on the eight leads 102a–102h that correspond to an eight-bit binary numerical counter that starts at zero (0) and counts consecutively to 255 before starting over at zero (0). The pulsed voltage timing signal from the clock circuit 94 on the lead 128 provides the driving clock signal for the counter circuit 96.

The digital voltage signals on the eight leads 102a–102h from the counter circuit 96 are input voltage signals to the latch circuit 100. The latch circuit 100 simply allows the digital voltage signals on the eight leads 102a–102h to become output digital voltage signals on the eight leads 106a–106h connected the latch circuit 100 to the digital-to-analog converter circuit 104, unless the latch circuit 100 receives the appropriate voltage signals on the lead 132, 120 during the time period $T_{VARY}$ to "latch" the digital voltage signals on the eight leads 106a–106h and hold them constant for the time period $T_{FIX}$, as will be discussed in more detail below. The clock circuit 94 is connected to the latch circuit 100 to provide the necessary timing signals for the latch circuit 100 during the time period $T_{VARY}$, as will also be discussed in more detail below.

Figure 7:
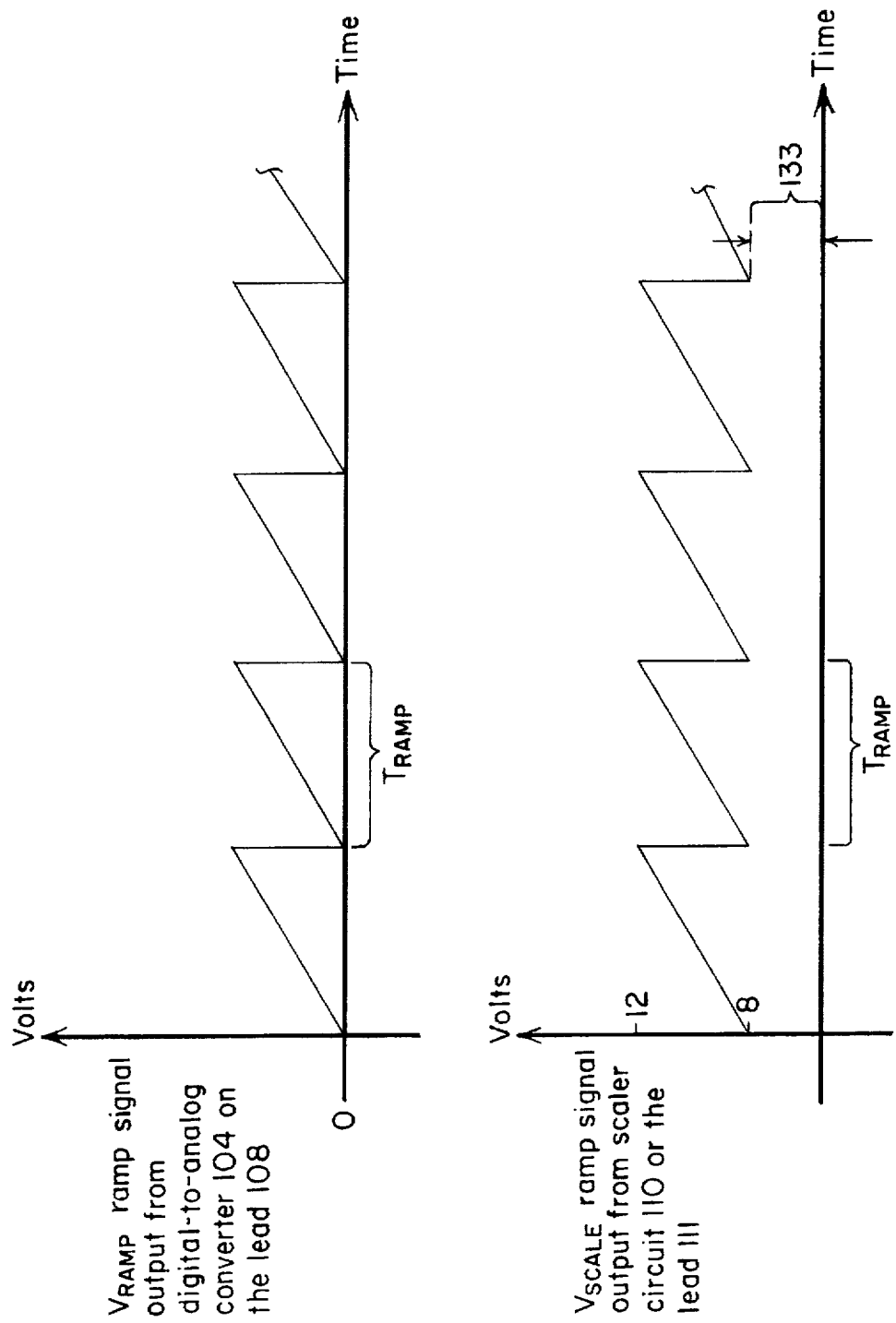
FIG. 7 shows the ramp-shaped analog voltage output signal from the digital-to-analog converter and the scaled analog signal from the scaler circuit for the generator system shown in FIG. 4.

The digital voltage signals on the eight leads 106a–106h from the latch circuit 100 are input voltage signals to the digital-to-analog converter circuit 104. The digital-to-analog converter circuit 104 converts the binary number between zero (0) and 255 represented by the digital voltage signals on the eight leads 106a–106h into a single representative analog voltage signal on the lead 108. Thus, the analog voltage signal on the lead 108 is a ramp function that has a minimum value of approximately zero (0) volts and a maximum value of approximately five (5) volts, as shown in FIG. 7. The ramped analog voltage signal from the digital-to-analog converter circuit 104 on the lead 108 is linearly related to the binary number represented by the digital voltage signals from the latch circuit 100 on the leads 106a–106h. The time period $T_{RAMP}$ of the ramped analog voltage signal on the lead 108 can be varied by increasing or decreasing the pulse rate of the periodic pulse timing voltage signal from the clock circuit 94 on the lead 132 connected to the latch circuit 100. For purposes of explanation, but not limitation, of the generator system 50 of the present invention, the ramped analog voltage signal from the digital-to-analog converter circuit 104 on the lead 108 will have a frequency of approximately twenty (20) hertz. Other frequencies can also be used.

The output ramped voltage signal from the digital-to-analog converter circuit 104 on the lead 108 is the input voltage signal to the scaler circuit 110. The scaler circuit 110 provides an adjustable offset or DC bias 133 to the ramp-shaped analog voltage signal on the lead 108 so that it has a minimum value of approximately eight (8) volts and a maximum value of approximately twelve (12) volts on the lead 111, as shown in FIG. 7. The output ramped analog voltage signal $V_{SCALE}$ from the scaler circuit 110 on the lead 111 is the input voltage signal to the comparator circuit 116.

Figure 8:
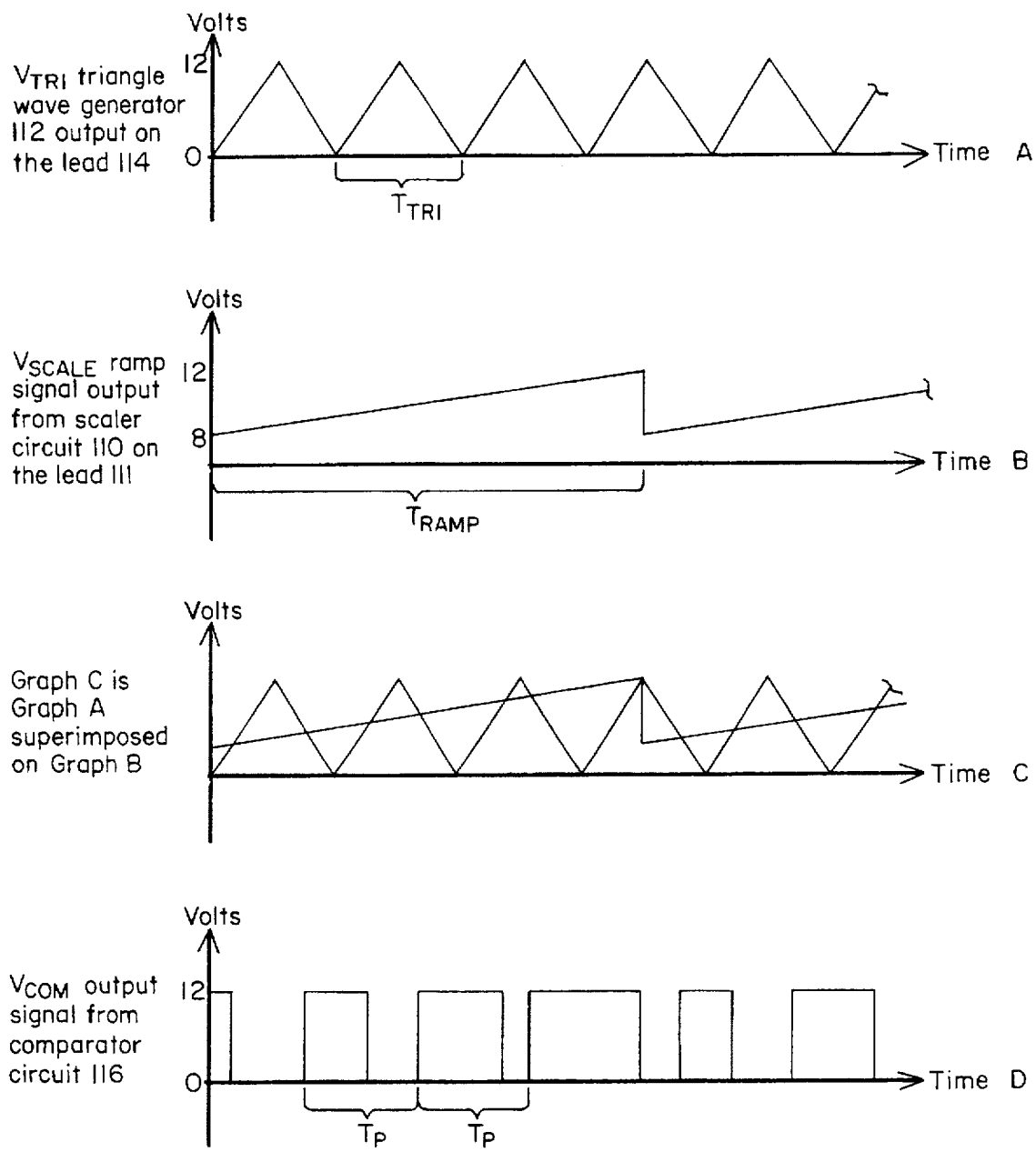
FIG. 8 shows the triangle shaped voltage output signal from the triangle wave generator of the generator system shown in FIG. 4.

The comparator circuit 116 compares the analog voltage signal $V_{SCALE}$ received from the scaler circuit 110 on the lead 111 with a triangle voltage waveform signal $V_{TRI}$ generated by the triangle wave generator 112 on the lead 114. The triangle voltage waveform signal $V_{TRI}$ generated by the triangle wave generator 112 on the lead 114 has a minimum voltage of approximately zero (0) volts, a maximum voltage of approximately twelve (12) volts, as shown in graph A of FIG. 8, and a frequency of approximately 10,000 hertz. Other frequencies for the triangle voltage waveform signal $V_{TRI}$ can also be used. The time period $T_{TRI}$ is significantly shorter than the time period $T_{RAMP}$. The comparator circuit 116 generates a voltage signal $V_{COM}$ on the lead 118 that is shown in graph D of FIG. 8. Essentially, whenever the ramp-shaped voltage signal $V_{SCALE}$ on the lead 111 has a higher voltage than the triangle wave voltage signal $V_{TRI}$ on the lead 114, the comparator circuit 116 produces a voltage signal $V_{COM}$ of approximately twelve (12) volts on the lead 118 and whenever the ramp-shaped voltage signal $V_{SCALE}$ on the lead 111 has a lower voltage than the triangle wave voltage signal $V_{TRI}$ on the lead 114, the comparator circuit 116 produces a voltage signal $V_{COM}$ of approximately zero (0) volts on the lead 118, as shown in graphs C and D of FIG. 8.

The voltage output signal $V_{COM}$ from the comparator circuit 116 on the lead 118 is the duty cycle signal for the boost converter 60 and controls the opening and closing of the switch 92 in the boost converter 60. When the $V_{COM}$ signal is approximately zero (0) volts, the switch 92 in the boost converter 60 is opened and the photovoltaic array 52 is connected to the battery circuit 54. When the voltage signal $V_{COM}$ is approximately twelve (12) volts, the switch 92 in the boost converter 60 is closed and the photovoltaic array 52 is not connected to the battery circuit 54. As previously discussed, as the voltage signal $V_{COM}$ varies, the duty cycle for the boost converter 60 varies, and the current $I_{BAT}$ flowing through the battery circuit 54 and the power output $P_{PVA}$ from the photovoltaic array 52 also vary accordingly.

The peak current finder 88 determines the peak current $I_{BAT}$ flowing through the battery circuit 54 on the lead 66 which is proportional to the peak power output from the photovoltaic array 52, as shown by equations (2) and (3). When the current $I_{BAT}$ flowing through the battery 56 starts to decrease, the peak current finder 88 sends an analog voltage "latching" signal to the filter circuit 120 on the lead 121 of approximately twelve (12) volts. The filter circuit 120, the inverting amplifier 122, and the level indicator 124 act to convert the analog voltage signal on the lead 121 to a digital logic level voltage signal on the lead 126 connecting the level indicator 124 and the latch circuit 100. More specifically, the peak current finder 88 creates an analog voltage signal of approximately twelve (12) volts on the lead 121 when the current $I_{BAT}$ flowing through the battery 56 starts to decrease. The analog voltage signal on the lead 121 is converted by the filter circuit 120, the inverting amplifier 122, and the level indicator 124 to a digital voltage signal of approximately five (5) volts on the lead 126.

Figure 9:
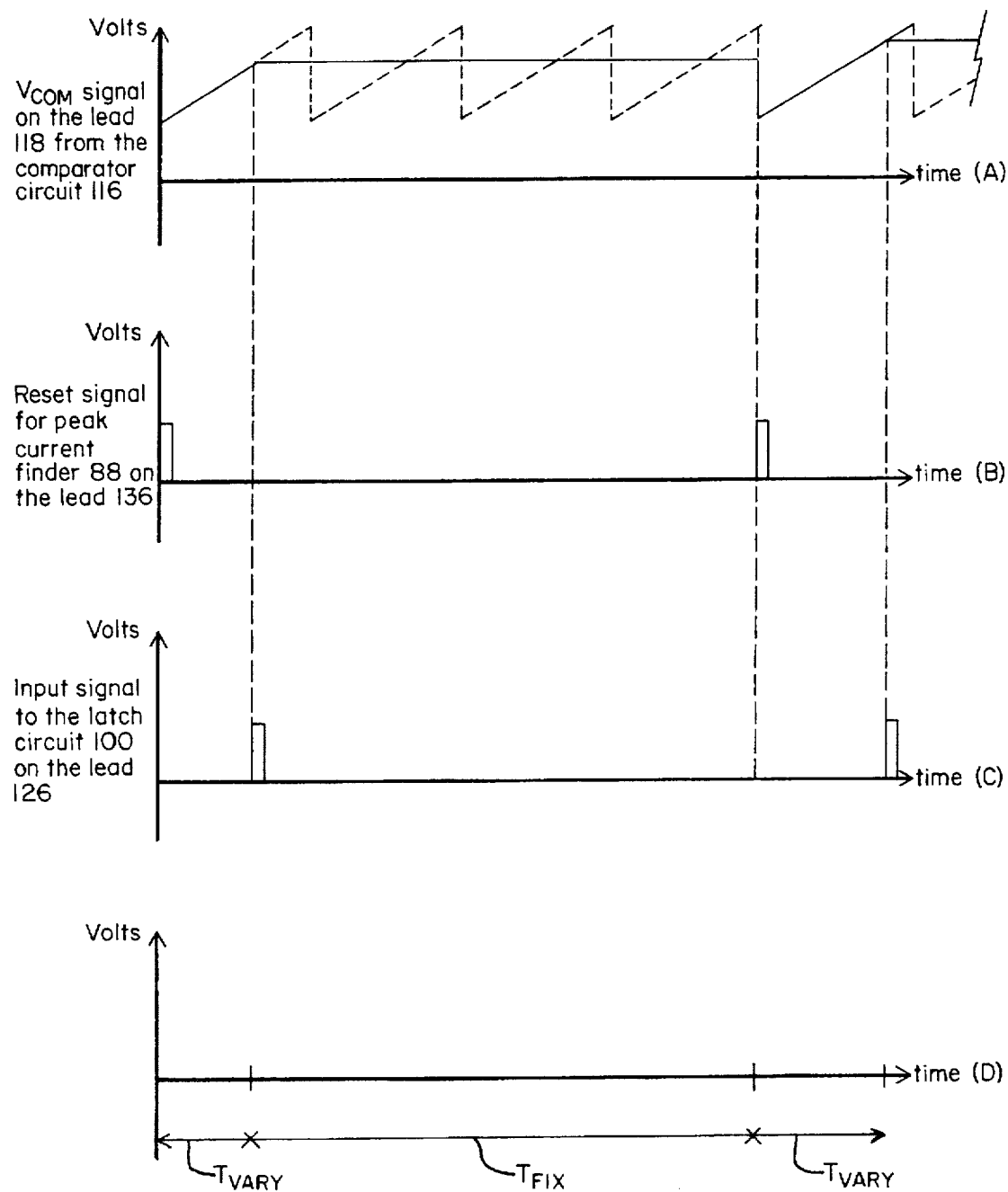
FIG. 9 shows the ramp-shaped voltage output signal from the scaler circuit of the generator system shown in FIG. 4 before and after the ramp-shaped voltage signal has been latched to a specific value.

When the latch circuit 100 detects a digital voltage signal of approximately zero (0) volts on the lead 126, the latch circuit 100 latches or fixes the output digital voltages signals on the eight leads 106a–106h which causes the ramp-shaped voltage signal on the lead 111 to "latch" to a specific value at time $T_L$ which will constitute the end of the time period $T_{VARY}$ and the beginning of the time period $T_{FIX}$, as shown in graph A of FIG. 9. As previously discussed, when the input signal into the comparator circuit 116 on the lead 111 is latched, the voltage output signal $V_{COM}$ from the comparator circuit 116 on the lead 118 creates a duty cycle for the boost converter 60 that does not vary during the time period $T_{FIX}$. When the duty cycle for the boost converter 60 does not vary during the time period $T_{FIX}$, the power output $P_{PVA}$ from the photovoltaic array 52 is held constant at its maximum value, assuming that the ambient weather conditions do not change significantly during the time period $T_{FIX}$.

After the time period $T_{FIX}$ has elapsed, the clock circuit 94 and the counter circuit 98 reinitialize the latch circuit 100 by sending a voltage signal on the lead 134 to the level indicator 124 which in turn creates a input voltage signal to the latch circuit 100 on the lead 126 so that the digital voltage signals on the leads 106a–106h are no longer held constant by the latch circuit 100. In addition, the clock circuit 94 and the counter circuit 98 create a signal on the lead 136 that reinitializes the peak current finder 88 so that the peak current finder 88 begins to search again for the maximum current $I_{BAT}$ flowing through the battery 56 during a new time period $T_{VARY}$.

For purposes of further explanation of the generator system 50, an exemplary set of timing signals are shown in FIG. 9. During the time period $T_{VARY1}$, the ramped output signal $V_{COM}$ increases linearly from a voltage of approximately eight (8) volts towards a maximum voltage of approximately twelve (12) volts. As previously discussed above, the change in the voltage $V_{COM}$ causes the duty cycle of the boost converter 60 to vary, thereby varying the electric current $I_{BAT}$ flowing through the battery 56. At the start of the time period $T_{VARY}$, the output voltage signal from the level indicator 124 and the input voltage signal to the latch circuit 100 on the lead 126 is approximately five (5) volts. When the peak current finder 88 determines that the electric current $I_{BAT}$ is maximized at time $T_{L1}$ during the time period $T_{VARY1}$, the input signal to the latch circuit 100 on the lead 126 becomes approximately zero (0) volts. This causes the firing circuit 90 to latch the voltage signal $V_{COM}$ on the lead 118 during the time period $T_{FIX}$. After the time period $T_{FIX}$ has expired, the input voltage signal to the latch circuit 100 on the lead 126 becomes approximately five (5) volts again, signaling the start of the time period $T_{VARY2}$. In addition, a reset voltage signal is simultaneously placed on the lead 136 for the peak current finder 88 to reinitialize the peak current finder 76 and have it determine once again the maximum value of the electric current $I_{BAT}$ flowing through the battery 56. In this example, a time period $T_{VARY}$ is started after every four cycles of the ramped voltage signal $V_{SCALE}$. It should also be noted that the length of the time periods $T_{VARY}$ and $T_{FIX}$ are not fixed. For example, the length of the time period $T_{VARY1}$ is not equal to the length of the time period $T_{VARY2}$, as shown in graph D of FIG. 9. Furthermore, since in this example a time period $T_{VARY}$ is started after every four cycles of the voltage signal $V_{SCALE}$, the length of each time period $T_{FIX}$ will depend on the length of the time period $T_{VARY}$ immediately preceding it.

Figure 5:
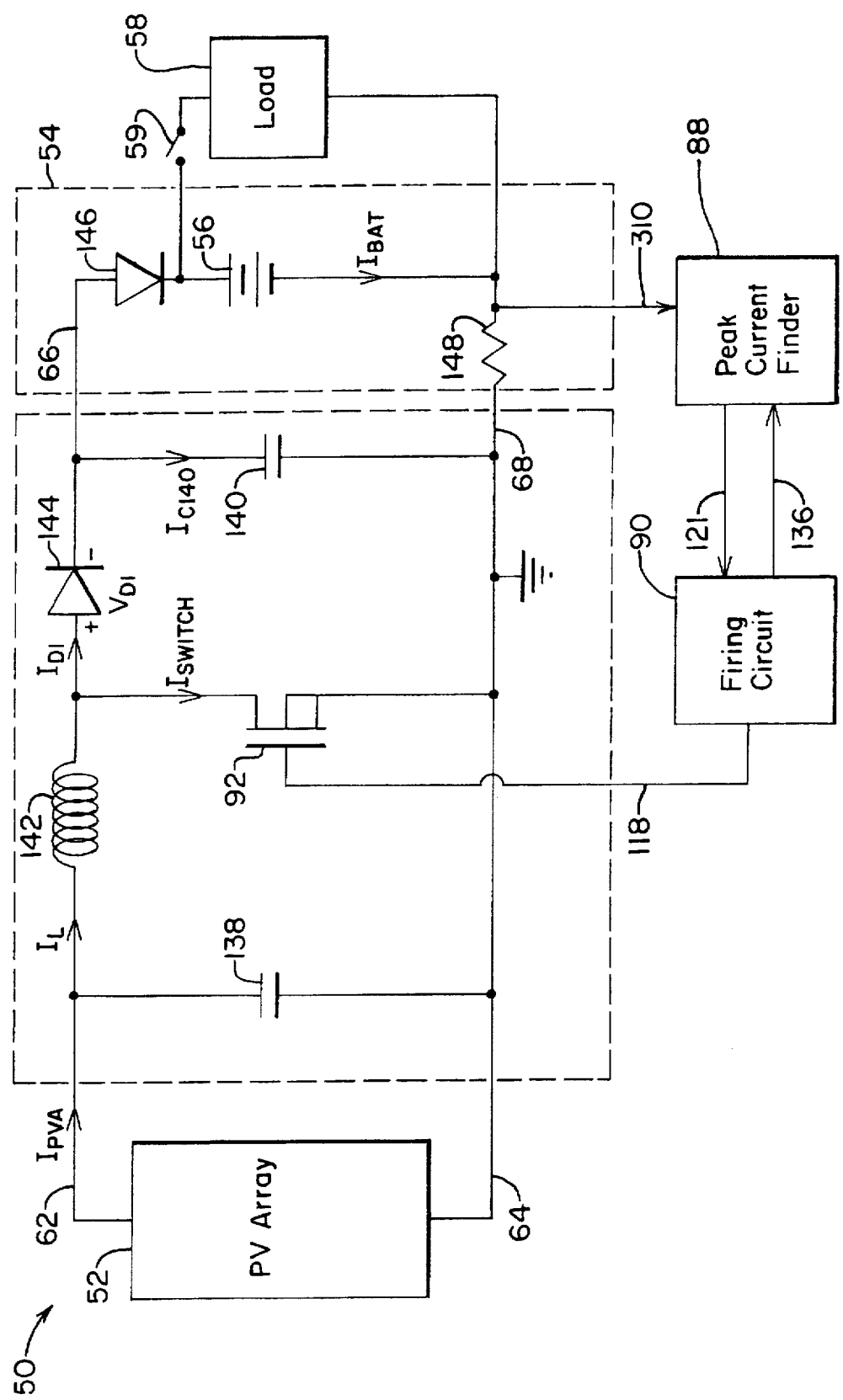
FIG. 5 shows a schematic diagram of boost converter and the battery circuit of the generator system of FIG. 4 constructed to supply power from the photovoltaic array to the battery.

More detailed exemplary schematic diagrams for the significant parts of the electronic circuitry in the generator system 50 are shown in FIGS. 5, 11, 13–20. Referring now to FIG. 5, the boost converter 54 includes the switch 92 for controlling the electrical connection and disconnection of the photovoltaic array 52 to the battery circuit 54, the capacitor 138 for smoothing the voltage $V_{PVA}$ produced by the photovoltaic array 52, the capacitor 140 for maintaining a constant voltage across the battery circuit 54, the inductor 142 for smoothing the electric current $I_{PVA}$ produced by the photovoltaic array 52, and the diode 144 to limit the direction of electric current flow. The battery circuit 54 includes the DC battery 56 that is recharged during the charging period, the diode 146 to prevent the battery from being discharged during electrical connection to the boost converter 60, and the resistor 148 for creating a voltage that is linearly related to the electric current $I_{BAT}$ and detected by the peak current finder 88. While the diode 146 is discussed below as part of the battery circuit 54, it is also alternatively possible for the diode 146 to be considered part of the boost converter 60 instead of the battery circuit 54.

When the photovoltaic array 52 begins generating the DC voltage $V_{PVA}$ and the DC electric current $I_{PVA}$, the capacitor 138 begins to charge, regardless of whether the switch 92 is opened or closed. When the capacitor 138 is fully charged, it acts to smooth the voltage $V_{VPA}$ signal produced by the photovoltaic array 52 during the charging period.

Figure 10:
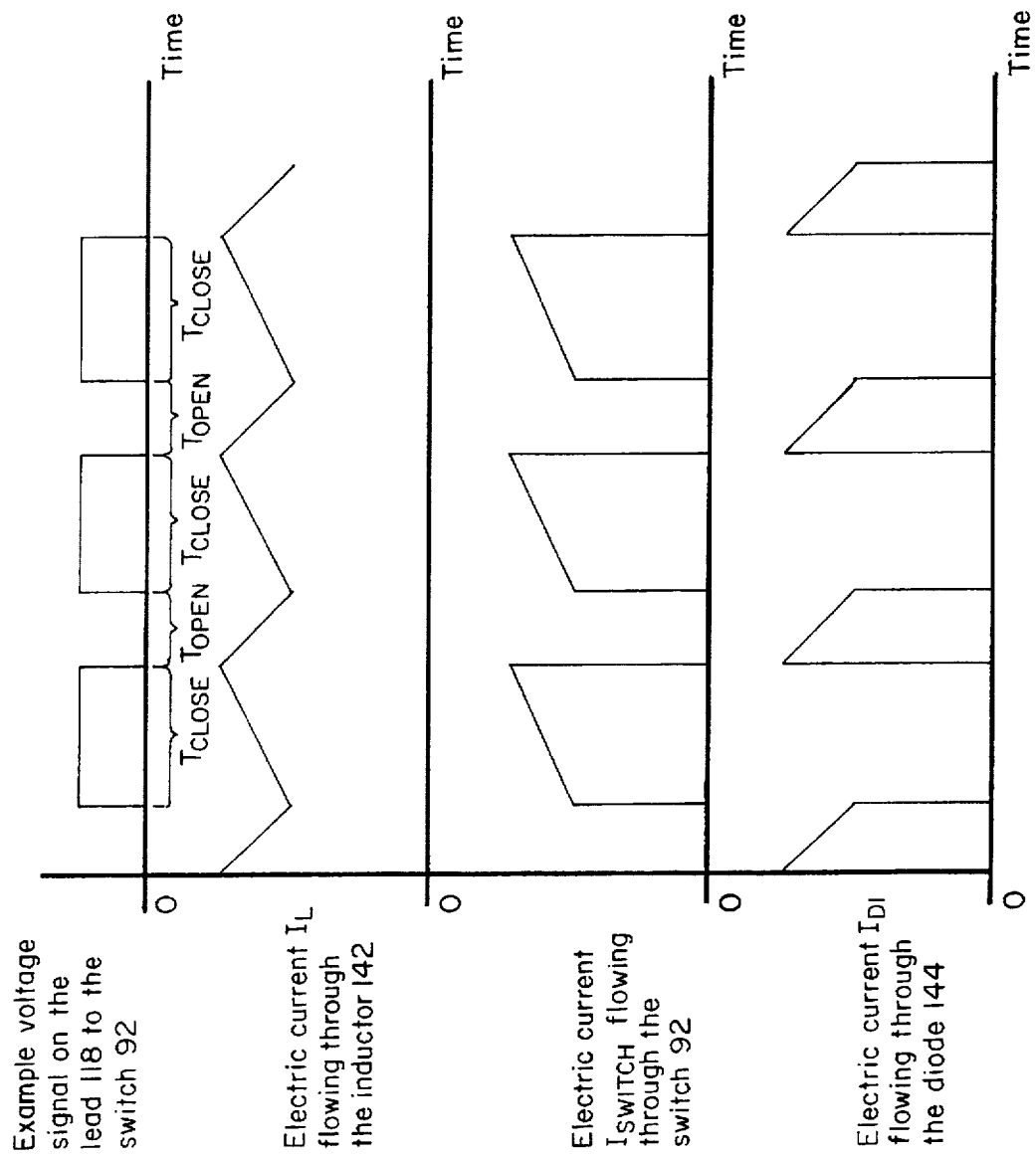
FIG. 10 shows the electric current signals $I_L$, $I_{Switch}$, and $I_{D1}$ in the boost converter of the generator system of FIG. 4.
Figure 11:
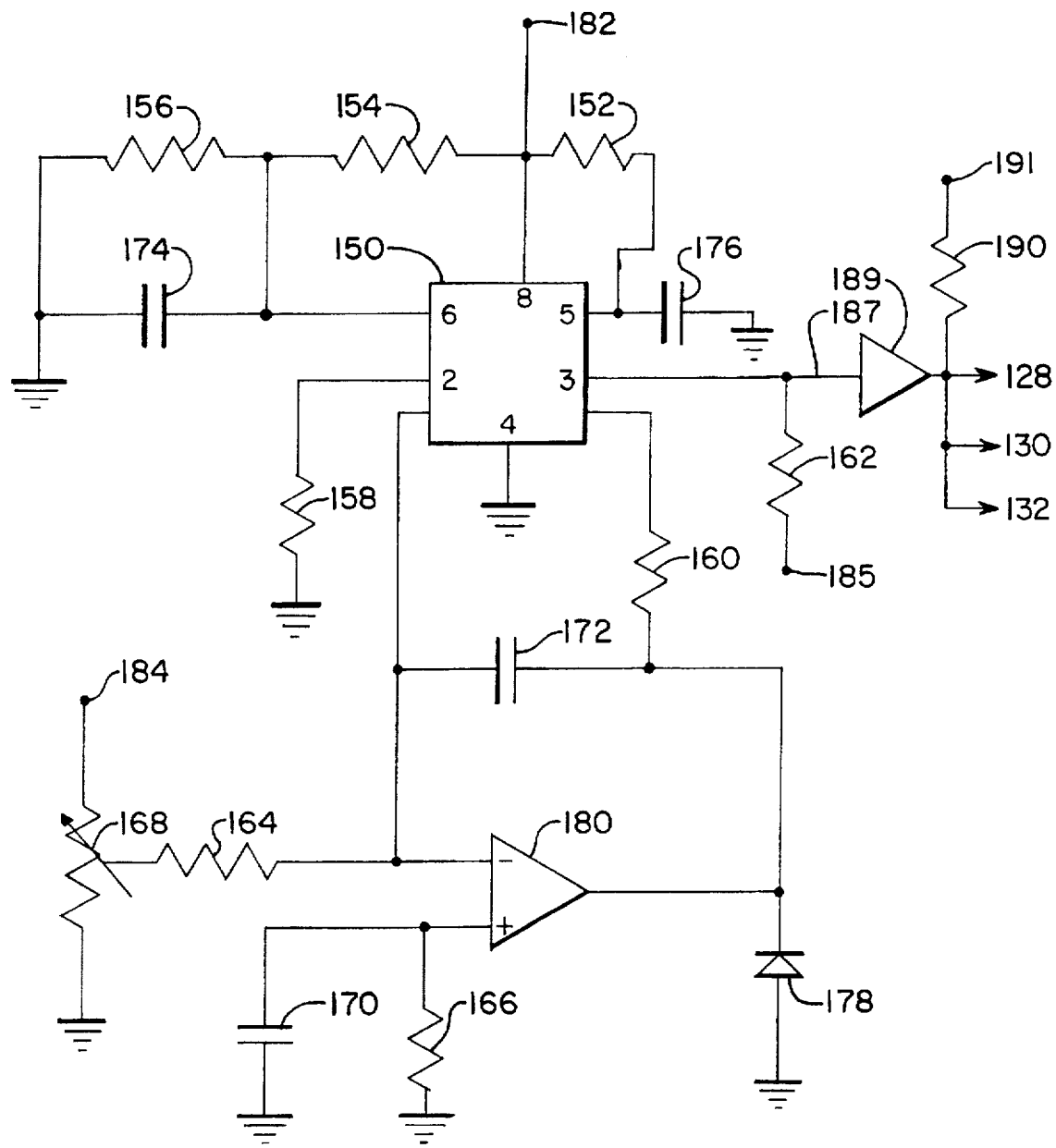
FIG. 11 shows a schematic diagram of the clock circuit of the generator system of FIG. 4 constructed to provide the necessary timing and reset signals to the two counter circuits and the latch circuit.

When the switch 92 is closed, the DC electric current $I_L$ flows through the inductor 142 and the switch 92, the DC electric current $I_{BAT}$ is equal to zero (0), and $I_L$ is equal to $I_{SWITC}$. When the switch 92 is opened, the DC electric current $I_L$ flows through the inductor 142 and the diode 144, $I_{SWITCH}$ is equal to zero (0), and $I_L$ is equal to $I_{D1}$ (see FIG. 10). The diode 144 prevents an electric current from flowing from the battery 56 or the load 58 into the inductor 142. The capacitor 136 can have a value of, for example, 50 microfarads. The inductor 142 can have a value of, for example, ten (10) microhenries. Furthermore, when the switch 92 is opened, the DC electric current $I_{C140}$ flows through the capacitor 140 and the DC electric current $I_{BAT}$ flows through the diode 146, the battery 56, and the resistor 148. After the capacitor 140 has become fully charged, the DC electric current $I_{C140}$ becomes essentially equal to zero (0) amperes and the capacitor 140 helps maintain a constant voltage across the battery 56. The diode 146 prevents an electric current from flowing out of the battery 56 that would discharge the battery 56. The capacitor 140 can have a value of, for example, five-hundred (500) microfarads.

As previously discussed above, the switch 92 and the duty cycle of the boost converter 60 are controlled by the firing circuit 90. The boost converter 60 operates in two possible states: one when the switch 92 is open and the other when the switch 92 is closed. If it is assumed that the current $I_L$ never reaches zero, the boost converter 60 is operating in a continuous conduction mode. In a steady state condition, therefore, the volt-seconds balance of the inductor 142 voltage over one time period $T_p$ must be equal to zero. Therefore, $$V_{PVA}T_{CLOSE}+(V_{PVA}-V_{BAT})T_{OPEN}=0 \qquad (4)$$

which can be simplified as:

$$\frac{V_{BAT}}{V_{PVA}} = \frac{1}{1-\text{DutyCycle}} \qquad (5)$$

where DutyCycle is the duty cycle of the boost converter 60 and is given in equation (1).

As the duty cycle of the boost converter 60 is varied by the firing circuit 90 and the switch 92 during the time periods $T_{VARY}$, the relationship between the voltages $V_{PVA}$ and $V_{BAT}$ varies accordingly. Since the $V_{BAT}$ can be considered to stay constant during any particular time period $T_{VARY}$, the voltage $V_{PVA}$ varies as the duty cycle of the boost converter 60 varies.

Figure 12:
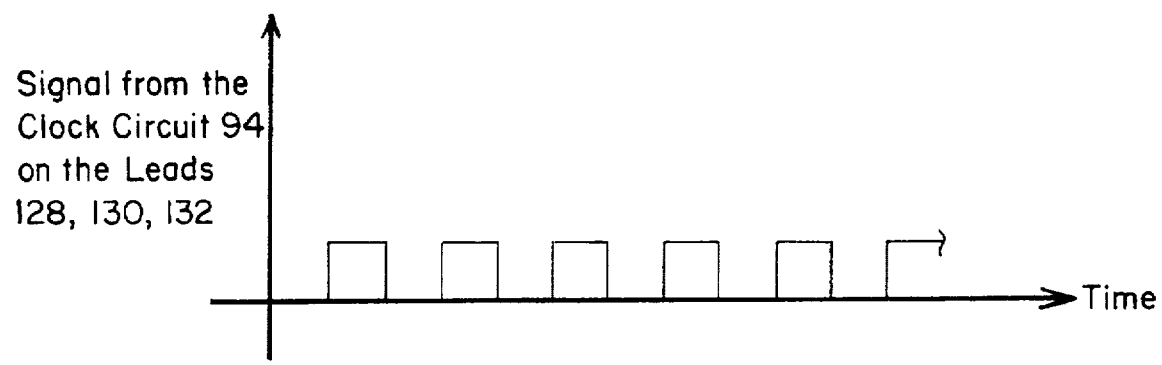
FIG. 12 shows the square wave voltage output signal from the clock circuit of the generator system shown in FIG. 4 constructed to provide timing and reset signals to the two counter circuits and the latch circuit.

The firing circuit 90 includes a clock circuit 94 for providing the necessary timing and reset signals for the remainder of the generator system 50. An example schematic diagram for the clock circuit 94 is given in FIG. 11. The voltage-to-frequency converter 150, the resistors 152, 154, 156, 158, 160, 162, 164, 166, the variable resistor 168, the capacitors 170, 172, 174, 176, the diode 178, and the operational amplifier 180 in the clock circuit 94 act together to form a continuous square wave voltage signal on the lead 187. The buffer 189 electrically separates and isolates the output voltage signal on the lead 187 and creates a pulsed signal on the leads 128, 130, 132 having a frequency of approximately ten (10) kilohertz, a maximum voltage of approximately five (5) volts, and a minimum voltage of approximately zero (0) volts, as shown in FIG. 12. The clock circuit 94 uses an LM331 Precision Voltage-to-Frequency Converter manufactured by National Semiconductor, Inc., of Santa Clara, California, as the voltage-to-frequency converter 150. The SN7407N Open Collector Buffer manufactured by Motorola can be used for the buffer 189 in the clock circuit 94. The resistor 152 can have a value of, for example, 6,500 ohms. The resistor 154 can have a value of, for example, 10,000 ohms. The resistor 156 can have a value of, for example, 10,000 ohms. The resistor 158 can have a value of, for example, 7,000 ohms. The resistor 160 can have a value of, for example, 2,200 ohms. The resistor 162 can have a value of, for example, 10,000 ohms. The resistor 164 can have a value of, for example, 100,000 ohms. The resistor 166 can have a value of, for example, 100,000 ohms. The resistor 168 can have a maximum value of, for example, 50,000 ohms. The capacitor 170 can have a value of, for example, 0.001 microfarads. The capacitor 172 can have a value of, for example, 479 picofarads. The capacitor 174 can have a value of, for example, 0.001 microfarads. The capacitor 176 can have a value of, for example, 330 picofarads. The voltage supplied on the leads 182, 184 can be, for example, twelve volts. The voltage supplied on the lead 185 can be, for example, five volts. The resistor 190 is used as pull up resistor for the buffer 189 and can have a value of, for example, 3,300 ohms. The voltage level on the lead 191 can be, for example, five volts.

Figure 13:
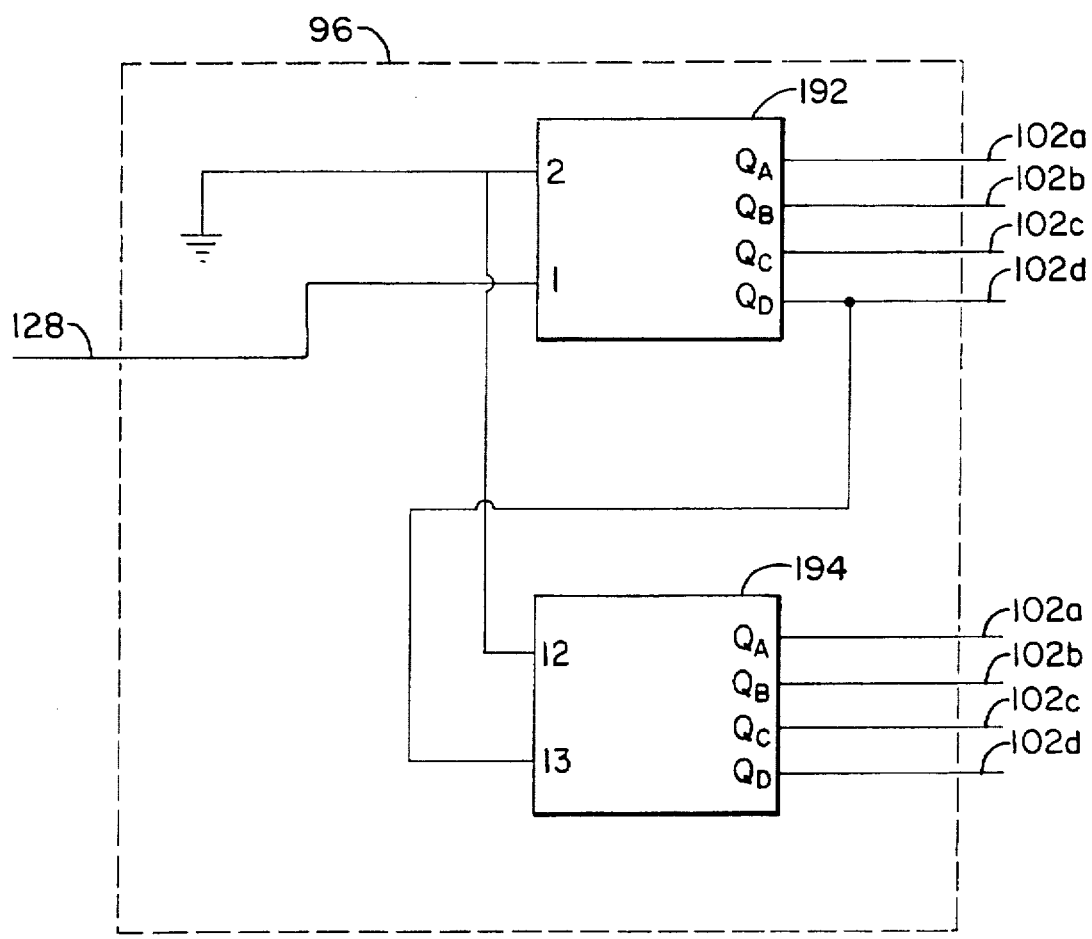
FIG. 13 shows a schematic diagram of the counter circuit of the generator system of FIG. 4 constructed to provide a modulo 255 counter and associated output voltage signals to the latch circuit.

The output square wave voltage signal from the clock circuit 94 on the lead 128 is an input signal to the counter circuit 96. Referring now to FIG. 13, the counter circuit 96 contains a pair of high speed ripple counters 192, 194 connected together in such a way that they form a binary number counter that counts consecutively between zero (0) and 255 before restarting. More specifically, the pulsing voltage signal (see FIG. 12) from the clock circuit 94 on the lead 128 creates resulting voltage signals from the counter circuit 96 on the leads 102a–102h representing an eight-bit binary number between zero (0) and 255. Each pulse from the voltage signal on the lead 128 from the clock circuit 94 causes the eight-bit binary number represented by the voltage signals on the leads 102a–102h to increase by a value of 1, thereby consecutively counting between zero (0) and 255. The pulsed signal on the lead 128 is an input signal to the ripple counter 192. The SN74LS393N Dual 4-Stage Binary Counter manufactured by Motorola can be used for the ripple counters 192, 194 in the counter circuit 96.

Figure 14:
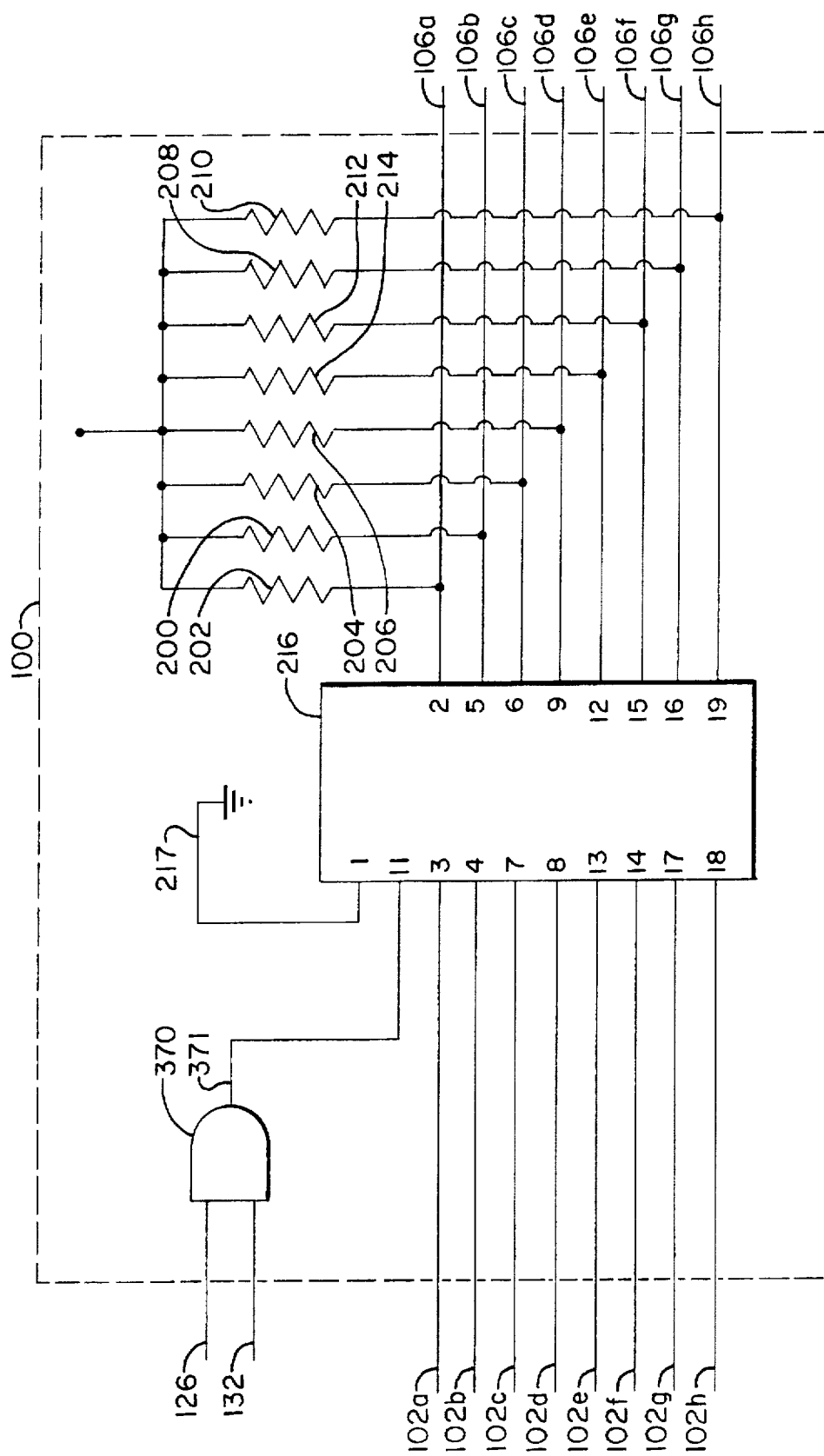
FIG. 14 shows a schematic diagram of the latch circuit of the generator system of FIG. 4 constructed to temporary latch or fix the input signals to the digital-to-analog converter circuit.

The output voltage signals from the counter circuit 96 on the leads 102a–102h are the input signals to the latch circuit 100, as shown in FIG. 14. As previously discussed above, the latch circuit 100 allows the voltage signals on the eight leads 102a–102h to become output voltage signals on the eight leads 106a–106h until the latch circuit 100 receives the appropriate voltage signals on the leads 132, 126 at time $T_L$ to latch or fix the voltage signals on the eight leads 106a–106h and hold them constant. More specifically, the latch circuit 100 does not latch the output voltage signals on the eight leads 106a–106h until the latch circuit 100 receives a voltage signal on the lead 126 of approximately zero (0) volts at time $T_L$. The latch circuit 100 then latches the voltage signals on the eight leads 106a–106h for the time period $T_{FIX}$.

The resistors 200, 202, 204, 206, 208, 210, 212, 214 are pull-up resistors for the leads 106a, 106b, 106c, 106d, 106e, 106f, 106g, 106h, respectively, and each can have a value of, for example, 3,300 ohms. The SN74LS373N Octal Transparent Latch manufactured by Motorola can be used for the latch 216 in the latch circuit 100. The lead 217, which is connected to pin 1 of the SN74LS373N, is also connected to ground to enable the outputs of the SN74LS373N on the leads 106a–106h.

Figure 15:
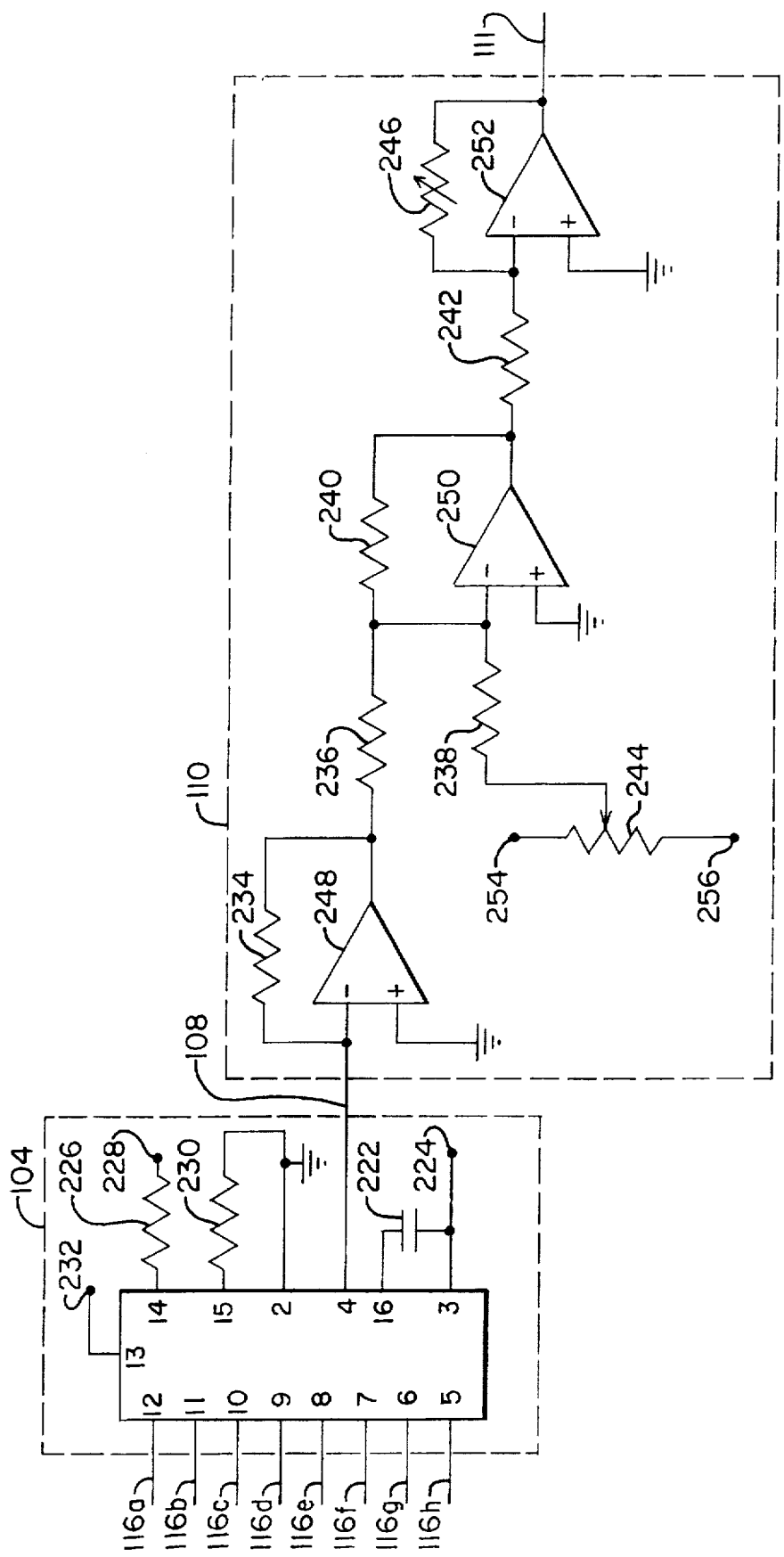
FIG. 15 shows a schematic diagram of the digital-to-analog converter circuit and the scaler circuit of the generator system of FIG. 4 constructed to create an analog voltage signal that is linearly related to the binary number represented by the output voltage signals from the latch circuit.

Now referring to FIG. 15, the eight output voltage signals from the latch circuit 100 on the eight leads 106a–106h are the input signals to the digital-to-analog converter circuit 104 which converts the eight-bit binary number represented by the voltage signals on the eight leads 106a–106h and converts them to a single ramped analog voltage signal (see FIG. 7) on the lead 108 that is linearly related to the eight-bit binary number. The ramped analog voltage signal on the lead 108 has a minimum voltage of approximately zero (0) volts and a maximum voltage of approximately five (5) volts. The MC1408 Eight Bit Multiplying Digital to Analog Converter manufactured by Motorola can be used for the digital-to-analog converter 220 in the digital to analog converter circuit 104. The capacitor 222 can be, for example, 0.01 microfarads. The voltage level on the lead 224 can be, for example, minus twelve (−12) volts. The resistor 226 and the voltage level on the lead 228 are used to determine the amount of amplification of the linear relationship between the binary number represented by the voltage signals on the leads 106a–106h and the analog voltage signal on the lead 108. The resistor 226 can have a value of, for example, 1,500 ohms. The voltage level on the lead 228 can be, for example, two (2) volts. The resistor 230 is used to temperature compensate the bias current for the MC1408 and can be, for example, 5,000 ohms. The voltage level on the lead 232 can be, for example, five (5) volts.

The analog ramped voltage output signal from the digital to analog converter circuit 104 on the lead 108 is the input signal to the scaler circuit 110. As previously discussed above, the scaler circuit 110 provides a DC bias to the ramp-shaped voltage input signal on the lead 108. The resistors 234, 236, 238, 240, 242, the variable resistors 244, 246 and the operational amplifiers 248, 250, 252 are arranged in a standard amplifying configuration so that the voltage signal $V_{SCALE}$ on the lead 111 has a minimum value of approximately eight (8) volts and a maximum value of approximately twelve (12) volts, as shown in FIG. 7. The resistor 234 can have a value of, for example, 5,000 ohms. The resistors 236, 238, 240, 242 can have a value of, for example, 20,000 ohms. The variable resistors 244, 246 are used to adjust the amount of the DC bias and can have maximum values of, for example, 100,000 ohms and 50,000 ohms, respectively. The voltages on the leads 254, 256 can be, twelve (12) volts and minus twelve (−12) volts, respectively. The output ramped analog voltage signal $V_{SCALE}$ from the scaler circuit 110 on the lead 111 is the input voltage signal to the comparator circuit 116.

Figure 16:
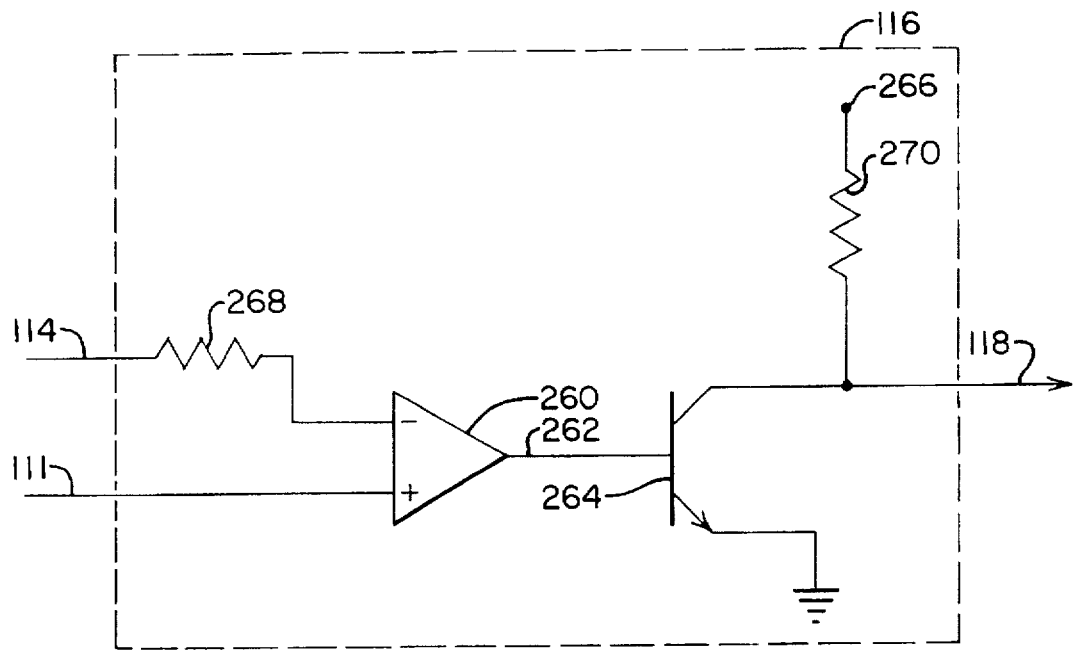
FIG. 16 shows a schematic diagram of the comparator circuit of the generator system of FIG. 4 constructed to compare the voltage signal from the triangle wave generator and the voltage signal from the scaler circuit.
Figure 17:
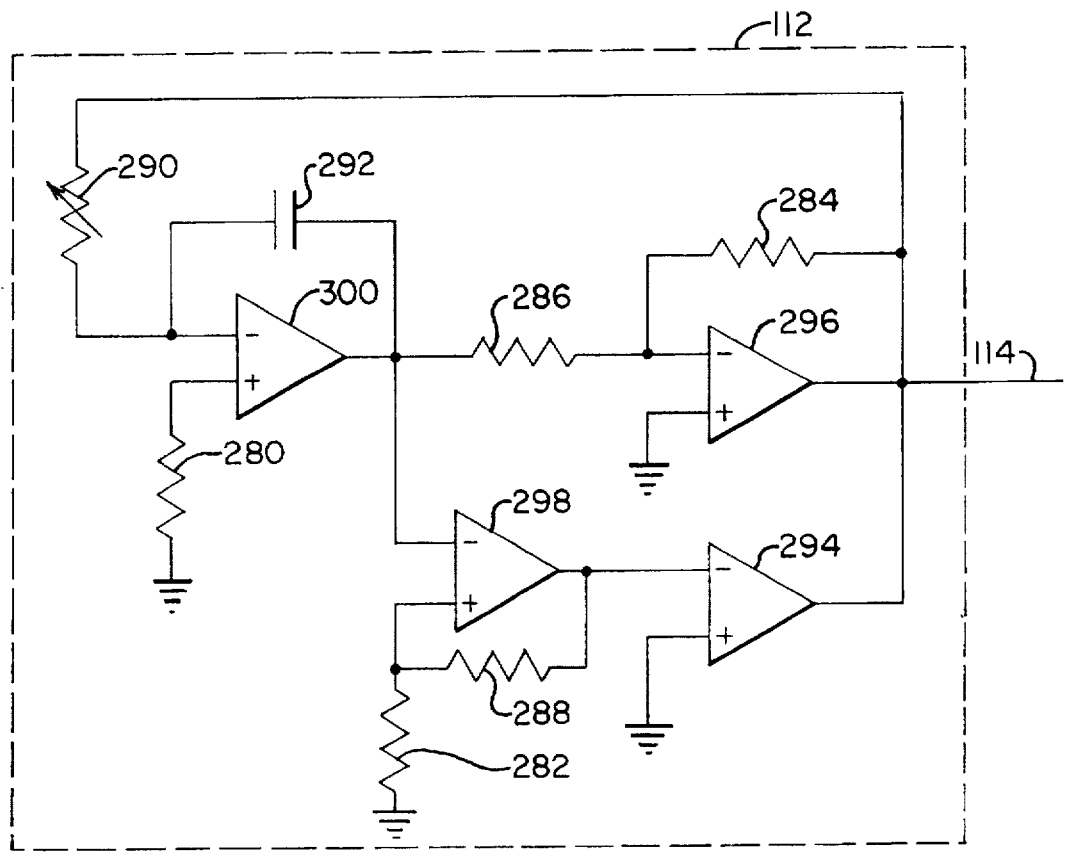
FIG. 17 shows a schematic diagram of the triangle wave generator of the generator system of FIG. 4 constructed to provide a triangle waveform voltage signal to the comparator circuit.
Figure 18:
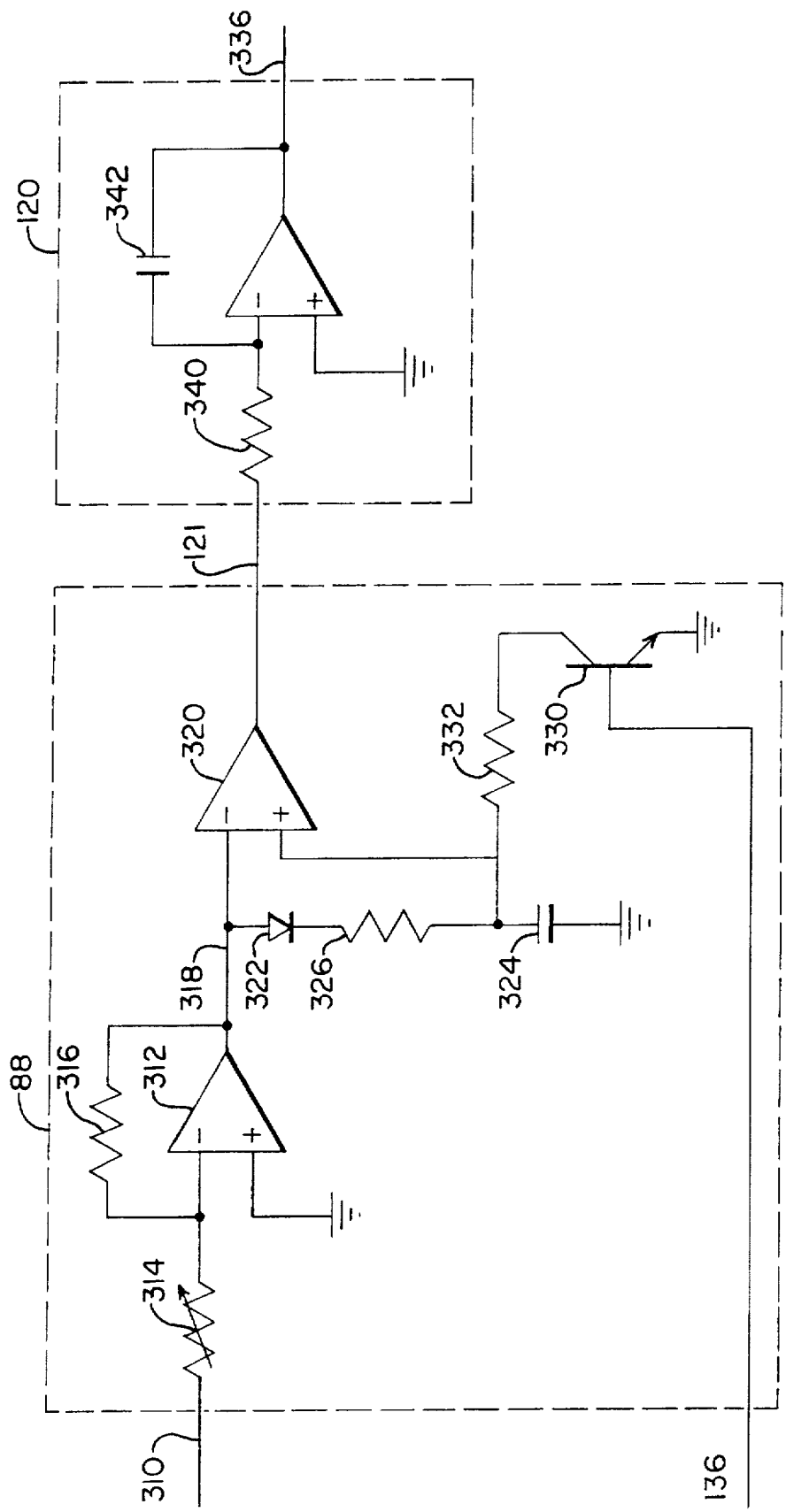
FIG. 18 shows a schematic diagram of the peak current finder and the filter of the generator system of FIG. 4 constructed to determine the peak current flowing through the battery and to smooth the output voltage signal from the peak current finder.

Now referring to FIG. 16, the comparator circuit 116 has an input voltage signal $V_{SCALE}$ on the lead 111 from the scaler circuit 110 and an input voltage signal $V_{TRI}$ on the lead 114 from the triangle wave generator 112. As previously discussed, the comparator circuit 116 compares the two voltage signals $V_{TRI}$, $V_{SCALE}$ and creates a corresponding signal on the lead 118 that constitutes the duty cycle signal for the switch 92 in the boost converter 60 shown in graph D of FIG. 8. More specifically, if the voltage signal $V_{TRI}$ on the lead 114 is higher than the voltage signal $V_{SCALE}$ on the lead 111, the output of the voltage comparator 260 on the lead 262 is a large negative voltage signal. Conversely, if the voltage signal $V_{TRI}$ is less than the voltage signal $V_{SCALE}$, the output of the voltage comparator 260 on the lead 262 is a large positive voltage signal. The output voltage signal from the voltage comparator 260 on the lead 262 is the input signal to the transistor 264.

If the output signal from the voltage comparator 260 on the lead 262 has a large positive voltage level, the transistor 264 will be activated and the voltage output signal $V_{COM}$ from the comparator circuit 116 on the lead 118 will have a value of approximately zero (0) volts. If the output signal from the voltage comparator 260 on the lead 262 has a low or large negative voltage level, the transistor 264 will not be activated and the output voltage signal $V_{COM}$ from the comparator circuit 116 on the lead 118 will have be approximately the same voltage that is on the lead 266. The voltage level on the lead 266 can be, for example, twelve (12) volts. A LM311 Voltage Comparator manufactured by the National Semiconductor Corporation of Santa Clara, Calif., can be used for the voltage comparator 260 and the transistor 264 in this invention.

The comparator circuit 116 includes the resistors 268, 270, the voltage comparator 260, the transistor 264, and the DC voltage signal provided by a power supply (not shown) on the lead 266. The resistor 268 is used to prevent saturation of the voltage comparator 260 and can have a value of, for example, 1,000 ohms. The resistor 270 can have a value of, for example, 10,000 ohms. The DC voltage level on the lead 266 can be, for example, five volts. The LM311 Voltage Comparator manufactured by the National Semiconductor Corporation can be used as the voltage comparator 260 in this invention.

As previously discussed, the triangle wave generator 112 creates an input signal to the comparator circuit 116. More specifically and now referring to FIG. 17, the resistors 280, 282, 284, 286, 288, the variable resistor 290, the capacitor 292, and the operational amplifiers 294, 296, 298, 300 create a triangle wave voltage signal $V_{TRI}$ on the lead 114 which is an input signal to the comparator circuit 116. The triangle voltage waveform signal $V_{TRI}$ generated by the triangle wave generator 112 on the lead 114 has a minimum voltage of approximately negative twelve (12) volts, a maximum voltage of approximately twelve (12) volts, as shown in graph A of FIG. 8, and a frequency of approximately 10,000 hertz. The variable resistor 290 is used to change the frequency of the triangular wave form. The resistor 280 can have a value of, for example, 12,700 ohms. The resistor 282 can have a value of, for example, 30,000 ohms. The resistor 284 can have a value of, for example, 100,000 ohms. The resistor 286 can have a value of, for example, 100,000 ohms. The resistor 288 can have a value of, for example, 13,000 ohms. The variable resistor 290 can have a maximum value of, for example, 200,000 ohms. The capacitor 292 can have a value of, for example, 0.05 microfarads.

Now referring back to FIG. 5, the output voltage signal $V_{COM}$ from the comparator circuit 116 on the lead 118 is the input signal to the switch 92 and is the duty cycle signal for the boost converter 60. When the $V_{COM}$ signal is approximately zero (0) volts, the switch 92 in the boost converter 60 is opened and the photovoltaic array 52 is connected to the battery circuit 54. When the voltage signal $V_{COM}$ is approximately twelve (12) volts, the switch 92 in the boost converter 60 is closed and the photovoltaic array 52 is not connected to the battery circuit 54. As previously discussed, as the voltage signal $V_{COM}$ varies, the duty cycle for the boost converter 60 varies, and the current $I_{BAT}$ flowing through the battery circuit 54 and the power output $P_{PVA}$ from the photovoltaic array 52 also vary accordingly.

The peak current finder 88 monitors the electric current $I_{BAT}$ flowing through the battery 56 to determine the maximum DC electric current flowing through the battery 56 during the time period $T_{VARY}$ that the duty cycle of the boost converter 60 is varied by the firing circuit 90. The electric current $I_{BAT}$ flowing through the battery 56 also flows through the resistor 148, thereby creating a voltage signal on the lead 310. Now referring to FIG. 18, the operational amplifier 312 and the resistors 314, 316 act as an amplifier to amplify the voltage signal on the lead 310 and create an amplified voltage signal on the lead 318. The resistor 314 can be a variable resistor so that the amplification can be altered as needed and can have a maximum value of, for example, 50,000 ohms. The resistor 316 can have a value of, for example, 20,000 ohms.

The voltage signal on the lead 318 is an input signal to the operational amplifier 320. Essentially, so long as the electric current $I_{BAT}$ is increasing during the time period $T_{VARY}$, the diode 322 is forward biased, the capacitor 324 is charging, and the output of the operational amplifier 320 on the lead 121 to the filter circuit 120 is a voltage signal of approximately ten (10) volts. When the electric current $I_{BAT}$ starts to decrease, the diode 322 becomes reverse biased, the capacitor 324 stops charging, and the output of the operational amplifier 320 on the lead 121 is a voltage signal of approximately twelve (12) volts. Just prior to when the electric current $I_{BAT}$ flowing through the battery 56 begins to decrease, $I_{BAT}$ is at its maximum. Therefore, the peak current finder 88 creates a voltage signal on the lead 121 that controls the operation of the latch circuit 100 so as to latch or fix the electric current $I_{BAT}$ to its maximum value during the time period $T_{FIX}$. In other words, the voltage signal from the operational amplifier on the lead 121 controls the operation of the latch circuit 100 and controls the beginning of the time period $T_{FIX}$. The resistor 326 is used to limit the current and can have a value of, for example, 180 ohms.

It is important that the capacitor 324 be fully discharged prior to the commencement of each time period $T_{VARY}$. Therefore, during each time period $T_{FIX}$, a high voltage signal will be placed on the lead 136 by the counter circuit 98 to activate the transistor 330 so that the capacitor 324 discharges by electric current flowing out of the capacitor 324 and through the transistor 330 and the resistor 332. The resistor 332 can have a value of, for example, 330 ohms. After the capacitor 324 is fully discharged and prior to the commencement of the next time period $T_{VARY}$, a low voltage signal will be placed on the lead 136 to deactivate the transistor 330 and to allow the capacitor 324 to recharge during the next time period $T_{VARY}$. The voltage signal on the lead 136 is controlled by the counter circuit 98.

The output voltage signal from the peak current finder 88 on the lead 121 is an input signal to the filter circuit 120 which smooths the voltage signal on the lead 121 resulting in another voltage signal on the lead 336. Smoothing the voltage signal on the lead 121 is required because stabilize the output signal on lead 336. The resistor 340 can have a value of, for example, 10,000 ohms. The capacitor 342 can have a value of, for example, 0.01 microfarads.

Figure 19:
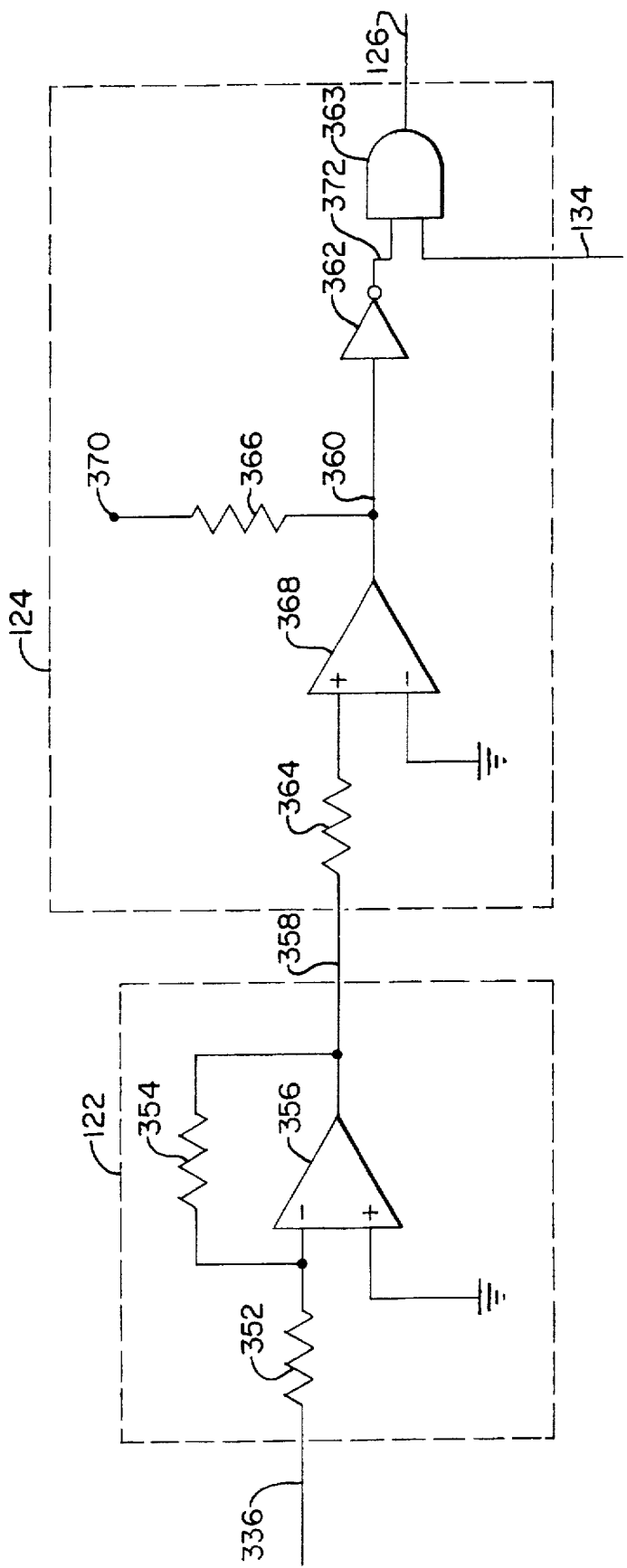
FIG. 19 shows a schematic diagram of the inverting amplifier and the level indicator of the generator system of FIG. 4 constructed to convert the analog voltage signal on the input to the inverting amplifier to a digital voltage signal on the lead connecting the level indicator and the latch circuit.
Figure 20:
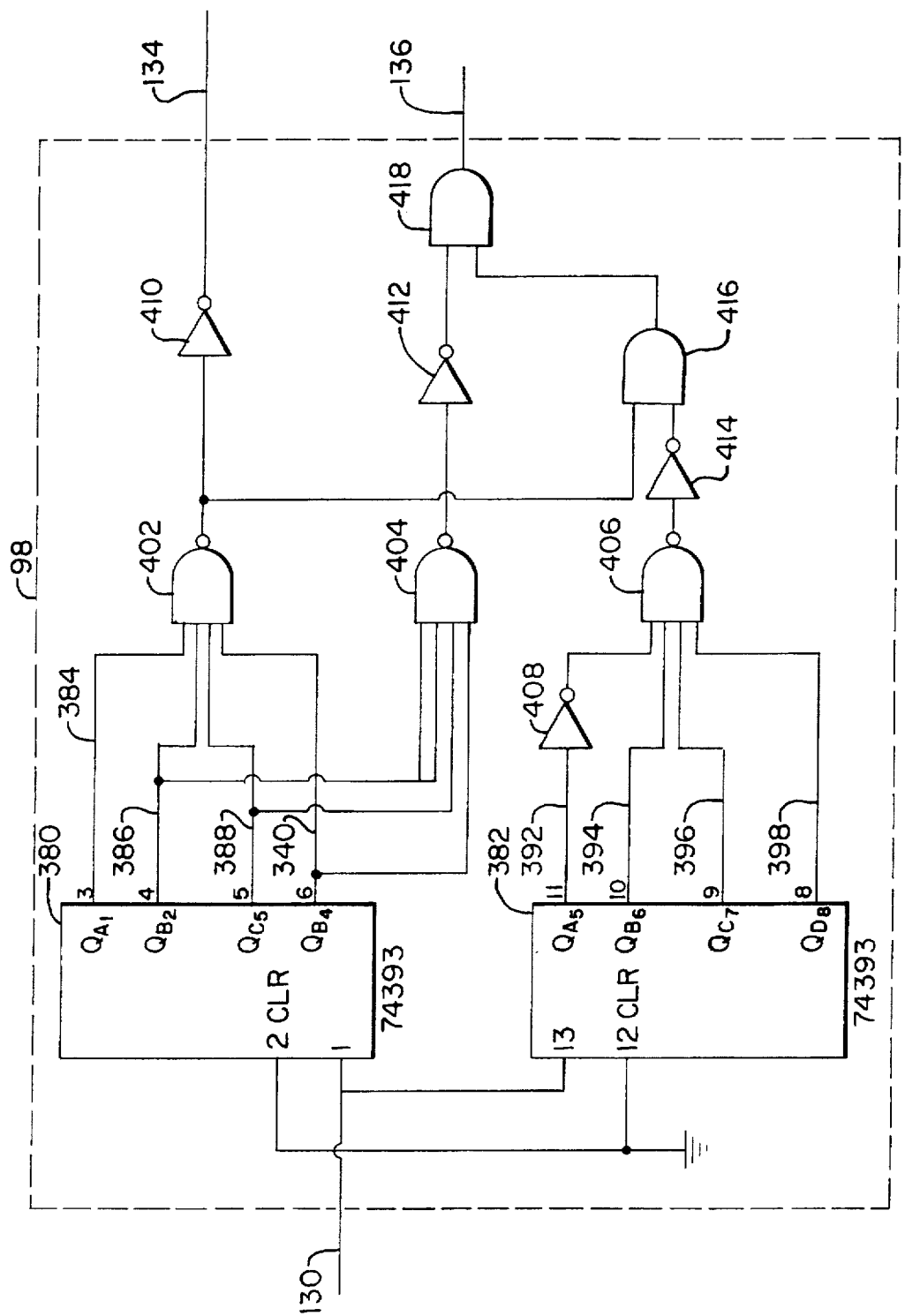
FIG. 20 shows a schematic diagram of the counter circuit connected to the peak current finder of the generator system of FIG. 4 constructed to initialize the discharge of the holding capacitor in the peak current finder.

The output voltage signal from the filter circuit 120 on the lead 336 is an input signal to the inverting amplifier 122, as shown in FIG. 19. The resistors 352, 354 and the operational amplifier 356 are arranged in a standard amplifier configuration that is well-known to people having ordinary skill in the art. The resistor 352 can have a value of, for example, 3,300 ohms. The resistor 354 can have a value of, for example, 10,000 ohms.

The output voltage signal from the inverting amplifier 122 on the lead 358 is an input signal to the level indicator 124 which is used to convert the analog voltage signal on the lead 358 to a suitable digital logic signal on the lead 360 so that analog circuit components can be connected to digital circuit components such as the inverter 362 and the AND-gate 363. When a high voltage signal is place on the lead 358, the resistors 364, 366, the operational amplifier 368, and the DC voltage level on the lead 370 create a voltage signal of approximately twelve (12) volts on the lead 360. When a low voltage signal is place on the lead 358, the resistors 364, 366, the operational amplifier 368, and the DC voltage level on the lead 370 create a voltage signal of approximately twelve (12) volts on the lead 360. The resistor 352 can have a value of, for example, 3,300 ohms. The resistor 354 can have a value of, for example, 10,000 ohms. The voltage level on the lead 370 can be, for example, five (5) volts.

The digital voltage signal on the lead 360 is converted by logic inverter 362 into the binary opposite logic voltage signal on the lead 372. The digital voltage signal on the lead 372 is an input signal to the AND gate 363 along with a digital voltage signal from the counter circuit 98 on the lead 134. In essence, when either of the voltages signals on the leads 372, 134 are logically low, the AND-gate 363 creates a low logic level voltage signal on the lead 126 which makes the latch circuit 100 latch or fix the voltage signals on the leads 106a–106h for a time period $T_{FIX}$. The voltage signal from the counter circuit 98 on the lead 134 insures that the latch circuit 100 will start latching the voltage signals on the leads 106a–106h only when the duty cycle of the boost converter 60 is varying during the time period $T_{VARY}$.

The output voltage signal from the level indicator 124 on the lead 126 is an input signal to the latch circuit 100. As previously discussed above, the latch circuit 100 simply allows the digital voltage signals on the eight leads 102a–102h to become output digital voltage signals on the eight leads 106a–106h connected the latch circuit 100 to the digital-to-analog converter circuit 104, unless the latch circuit 100 receives the appropriate voltage signals on the leads 132, 126 to "latch" the digital voltage signals on the eight leads 106a–106h and hold them constant. More specifically, the latch circuit 100 does not latch the output voltage signals on the eight leads 106a–106h until the latch circuit 100 receives a low logic level voltage signal on the lead 126 simultaneously with a low logic level voltage signal on the lead 132. The voltage signals on the leads 132, 126 are "anded" together by the AND-gate 370 to create a low logic signal on the lead 371 (see FIG. 14) to latch the voltage signals on the eight leads 106a–106h for the time period $T_{FIX}$. The voltage signals on the leads 132, 126 must be "anded" together by the AND-gate 370 in order to synchronize the clock and the Peak Finder output.

The counter circuit 98 provides the necessary timing signals to periodically create a signal on the lead 136 that reinitializes the peak current finder 88 and causes the discharge of the capacitor 324 (see FIG. 18) so that the peak current finder 88 begins a new search to determine the maximum current $I_{BAT}$ flowing through the battery circuit 54 for each time period $T_{VARY}$. An example schematic diagram for the counter circuit 98 is given in FIG. 20.

The counter circuit 98 contains a pair of high speed ripple counters 380, 382 connected together in such a way that they create two four-bit binary number counters that simultaneously count between zero (0) and fifteen (15) consecutively before restarting. More specifically, the pulsing voltage signal (see FIG. 12) from the clock circuit 94 on the lead 130 creates resulting voltage signals from the counter circuit 98 on the leads 384, 386, 390, 392 representing a four-bit binary number between zero (0) and fifteen (15). Likewise, the pulsing voltage signal (see FIG. 12) from the clock circuit 94 on the lead 130 creates resulting voltage signals from the counter circuit 98 on the leads 392, 394, 396, 398 representing a four-bit binary number between zero (0) and fifteen (15). Each pulse from the voltage signal from the clock circuit 94 on the lead 130 causes the four-bit binary number represented by the voltage signals on the leads 384, 386, 388, 390 to increase by a value of 1, thereby counting between zero (0) and fifteen (15) consecutively and repeatedly. Simultaneously, each pulse from the voltage signal from the clock circuit 94 on the lead 130 causes the four-bit binary number represented by the voltage signals on the leads 392, 394, 396, 398 to increase by a value of 1, thereby counting between zero (0) and fifteen (15) consecutively and repeatedly. The SN74LS393N Dual 4-Stage Binary Counter manufactured by Motorola can be used for the ripple counters 380, 382 in the counter circuit 98.

The output voltage signals from the ripple counters 380, 382 on the leads 384, 386, 388, 390, 392, 394, 396, 398 pass through a configuration of NAND-gates 402, 404, 406, inverters 408, 410, 412, 414, and AND-gates 416, 418 to create the necessary timing signal on the lead 136 to reset the peak current finder 88 and the necessary timing signal on the lead 134 so that the capacitor 324 in the peak current finder 88 is discharged prior to the commencement of each time period $T_{VARY}$ and to control the latching of the latch circuit 100 so that the latch circuit 100 only starts to latch the voltage signals on the eight leads 106a–106h at a point during the time $T_{VARY}$.

As is obvious from the previous discussion and FIG. 5, the lead 62 is the positive electric terminal of the photovoltaic array 52, the capacitor 138, and the inductor 142. Likewise, the lead 66 is the positive electric terminal of the capacitor 140 and the diode 146 and the negative electric terminal for the diode 144. Similarly, the lead 68, which is preferably electrically grounded, is the negative electric terminal of the photovoltaic array 52, the switch 92, the capacitor 138, the capacitor 140, and the resistor 140. The negative electric terminal of the inductor 142 is also the positive electric terminal of the switch 92 and the inductor 144. The negative electric terminal of the diode 146 is also the positive electric terminal of the battery 56 and the negative electric terminal of the battery 56 is the positive electric terminal of the resistor 148.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Apparatus for controlling electric power that is generated by a photovoltaic cell and delivered to a battery that has positive and negative terminals, wherein the photovoltaic cell also has positive and negative terminals and the photovoltaic cell generates an electric voltage between its positive and negative terminals and a corresponding electric current flowing out of its positive terminal when radiation is incident on the photovoltaic cell, and wherein the battery has an electric voltage between its positive and negative terminals that is approximately constant during a predetermined time period, comprising:

converter means electrically connected to the photovoltaic cell and to the battery for electrically connecting and disconnecting the photovoltaic cell to and from the battery, for controlling and varying the electric voltage generated between the positive and negative terminals of the photovoltaic cell, and for generating and controlling an electric current that flows through the battery such that the electric power generated by the photovoltaic cell is at a maximum during the time period when the electric current flowing through the battery is at a maximum during the time period, said converter means including a switch means for controlling when said converter means electrically connects the photovoltaic cell to the battery and when said converter means electrically disconnects the photovoltaic cell from the battery, wherein said switch means has a first state of operation and a second state of operation such that when said switch means is operating in its first state of operation the photovoltaic cell is electrically connected to the battery and when said switch means is operating in its second state of operation the photovoltaic cell is electrically disconnected from the battery;

peak current determining means coupled to the battery for determining when the electric current flowing through the battery is at a maximum and for generating an electric signal when the electric current flowing through the battery is at a maximum; and switch control means electrically connected to said switch means and to said peak current determining means for controlling when said switch means is operating in said first state of operation and when said switch means is operating in said second state of operation, wherein said switch control means is responsive to said electric signal generated by said peak current determining means.

2. The apparatus of claim 1, wherein said switch control means includes first electric voltage waveform generator means for generating a triangle electric voltage waveform during the time period, second electric voltage waveform generator means for generating a ramp-shaped electric voltage waveform during a first portion of the time period and a fixed voltage waveform during a second portion of the time period, and comparator means for comparing said electric voltage waveforms produced by said first and second electric voltage waveform generator means and for creating an electric voltage waveform having a varying duty cycle during said first portion of the time period and a fixed duty cycle during said second portion of the time period.

3. The apparatus of claim 2, wherein the total of said first and second portions of the time period is less than or equal to the time period.

4. The apparatus of claim 3, wherein the total of said first and second portions of the time period is equal to the time period.

5. The apparatus of claim 2, wherein said triangle electric voltage waveform produced by said first voltage waveform generator means has a frequency of approximately ten thousand (10,000) hertz.

6. The apparatus of claim 2, wherein said ramp-shaped electric voltage waveform produced by said second voltage waveform generator means during said first portion of the time period has a frequency of approximately twenty (20) hertz.

7. The apparatus of claim 2, wherein said second electric voltage waveform generator means includes a counter means for producing a plurality of electric voltage signals digitally representing a binary number and a digital-to-analog converter means for converting said digitally represented binary number produced by said counter means on said plurality of electric voltage signals to a single voltage signal having an amplitude linearly related to said digitally represented binary number.

8. The apparatus of claim 7, wherein said second electric voltage waveform generator means further includes latching means electrically disposed between said counter means and said digital-to-analog converter means for allowing said plurality of electric voltage signals produced by said counter means to be input signals to said digital-to-analog converter means during said first portion of the time period, and for latching the input signals to said digital-to-analog converter means during said second portion of the time period.

9. The apparatus of claim 8, wherein said switch control means further includes a clock means for providing an electric signal to said latching means when said first portion of the time period has started.

10. The apparatus of claim 8, wherein said switch control means sends an electric signal to said peak current determining means when said first portion of the time period has started.

11. The apparatus of claim 2, wherein said peak current determining means includes a resistor in electrical series with the battery such that all of the electric current flowing through the battery also flows through said resistor.

12. The apparatus of claim 11, wherein said peak current determining means further includes a capacitor that is electrically discharged prior to said first portion of the time period and electrically charged during said first portion of the time period.

13. The apparatus of claim 1, wherein said converter means includes a capacitor electrically connected to said positive and negative terminals of the photovoltaic cell such that said capacitor is in electrical parallel with the photovoltaic cell.

14. The apparatus of claim 1, wherein said switch means has a first electric terminal and a second electric terminal and said second electric terminal of said switch means is electrically connected to said negative terminal of the photovoltaic cell.

15. The apparatus of claim 14, wherein said converter means includes an inductor electrically connected between the positive terminal of the photovoltaic cell and said first electric terminal of said switch means.

16. The apparatus of claim 15, including first current flow prevention means for preventing electric current from flowing out of the positive terminal of the battery, wherein said first current flow prevention means has a first electric terminal and a second electric terminal, said second electric terminal of said first current flow prevention means is electrically connected to the positive terminal of the battery, and said second electric terminal of said first current flow prevention means is electrically connected to said converter means.

17. The apparatus of claim 16, wherein said first current flow prevention means includes a diode.

18. The apparatus of claim 16, wherein said converter includes a capacitor having a first electric terminal and a second electric terminal wherein said first electric terminal of said capacitor is electrically connected to said first electric terminal of said first current flow prevention means and said first electric terminal of said capacitor is electrically connected to said second electric terminal of said switch means.

19. The apparatus of claim 18, wherein said converter means includes a second current flow prevention means for preventing electric current from flowing out of said first electric terminal of said capacitor and through said switch means and through said inductor.

20. The apparatus of claim 19, wherein said second current flow prevention means includes a diode.

21. Method of controlling electric power generated by a photovoltaic cell and delivered to a battery that has positive and negative terminals, wherein the photovoltaic cell also has positive and negative terminals and the photovoltaic cell generates an electric voltage between its positive and negative terminals and a corresponding electric current flowing out of its positive terminal when radiation is incident on the photovoltaic cell, and wherein the battery has an electric voltage between its positive and negative terminals that is approximately constant during a predetermined time period, comprising the steps of:

electrically coupling the photovoltaic cell and the battery such that an electric current flows through the battery, varying the electric voltage generated between the positive and negative terminals of the photovoltaic cell will result in varying of the electric current flowing through the battery, and such that the electric power generated by the photovoltaic cell during the time period is at a maximum when the electric current flowing through the battery during the time period is at a maximum;

varying the electric voltage between the positive and negative terminals of the photovoltaic cell during a first portion of the time period;

determining when the electric current flowing through the battery is at a maximum during said first portion of the time period; and maintaining the electric voltage between the positive and negative terminals of the photovoltaic cell for a second portion of the time period such that said determined maximum electric current flowing through the battery is maintained during said second portion of the time period.

22. The method of claim 21, wherein said first portion of the time period and said second portion of the time period occur sequentially.

23. The method of claim 22, wherein the total of said first and second portions of the time period is less than or equal to the time period.

24. The method of claim 23, wherein the total of said first and second portions of the time period is equal to the time period.

25. The method of claim 21, including the step of measuring the electric current flowing through the battery during said first portion of the time period.

26. The method of claim 21, including the step of maintaining approximately a constant electric voltage between the positive and negative terminals of the battery during the time period.

27. The method of claim 21, wherein the electric current flowing through the battery is linearly related to the electric power generated by the photovoltaic cell during the time period.

28. The method of claim 21, wherein said step of coupling the photovoltaic cell to the battery includes the steps of electrically connecting a converter to the photovoltaic cell and the battery, wherein said converter has a switch which controls the electrical connection and disconnection of the photovoltaic cell and the battery.

29. The method of claim 28, including the steps of providing a duty cycle signal to said switch which turns said switch on and off and varying said duty cycle signal during said first portion of the time period and fixing said duty cycle signal during said second portion of the time period.

30. The method of claim 29, wherein said switch has a first electric terminal and a second electric terminal, and including the step of connecting said second electric terminal of said switch to the negative terminal of the photovoltaic cell.

31. The method of claim 30, including the step of electrically connecting an inductor between the positive terminal of the photovoltaic cell and said first electric terminal of said switch.

32. The method of claim 31, including the step of electrically connecting a capacitor to the positive and negative terminals of the photovoltaic cell such that said capacitor is in electric parallel to the photovoltaic cell.

33. The method of claim 21, including the step of electrically connecting a resistor in series with the battery such that all of the electric current flowing through the battery also flows through said resistor.

34. Apparatus for optimizing electrical power production by a photovoltaic power source that is electrically connected by an electric circuit to a battery, comprising:

a voltage converter positioned in the electric circuit between the photovoltaic power source and the battery with the capability of varying voltage across the photovoltaic power source in response to a firing signal; and a peak current detector connected to the electric circuit and a firing circuit, said peak current detector having a capability to detect when a varying electric current flowing through the battery is at a maximum and to produce a peak current signal when said electric current flowing through the battery is at the maximum, wherein said firing circuit is also connected to said voltage converter and has a capability of producing said firing signal in a variable manner that causes said voltage converter to vary voltage across the photovoltaic power source until said peak current detector produces a peak current signal and, in response to said peak current signal, producing said firing signal in a nonvariable manner.

35. The apparatus of claim 34, including a timing circuit connected to said firing circuit, wherein said timing circuit has a capability of producing timing signals, and wherein said firing circuit is responsive to said timing signals to produce said firing signals in said nonvariable manner for a time period and then to produce said firing signals in said variable manner.

36. The apparatus of claim 34, wherein said voltage converter includes a boost voltage circuit comprising an inductor positioned between the photovoltaic power source and the battery, a switch that opens and closes a short circuit across said photovoltaic's power source between said photovoltaic power source and said battery, and a diode between said short circuit and said battery, said switch being responsive to said firing signals to open and close said short circuit repetitively at a variable rate when said firing signals are variable and at a nonvariable rate when said firing signals are nonvariable.

37. A method of optimizing power production by a photovoltaic power source that is being used to charge a battery, comprising the steps of:

using a boost converter with a variable duty cycle to vary voltage across the photovoltaic power source while monitoring current flow through the battery until maximum current flow through the battery is detected and then maintaining for a period of time whatever duty cycle that existed to produce the maximum current flow.

38. The method of claim 37, including the steps of varying the duty cycle again after the period of time until a subsequent maximum current flow through the battery is detected and then maintaining for a subsequent period of time whatever duty cycle that existed to produce the subsequent maximum current flow.

39. A method of optimizing power production by a photovoltaic power source that is being used to charge a battery, comprising the steps of:

varying the voltage across the photovoltaic power source while monitoring current flow through the battery until maximum current flow through the battery is detected and then maintaining for a period of time whatever voltage existed across the photovoltaic power source to produce the maximum current flow through the battery.

40. Apparatus for controlling electric power that is generated by a photovoltaic cell and delivered to a battery that has positive and negative terminals, wherein the photovoltaic cell also has positive and negative terminals and the photovoltaic cell generates an electric voltage between its positive and negative terminals and a corresponding electric current flowing out of its positive terminal when radiation is incident on the photovoltaic cell, and wherein the battery has an electric voltage between its positive and negative terminals that is approximately constant during a time period, comprising:

converter means electrically connected to the photovoltaic cell and to the battery for electrically connecting and disconnecting the photovoltaic cell to and from the battery, for controlling and varying the electric voltage generated between the positive and negative terminals of the photovoltaic cell, and for controlling an electric current that flows through the battery such that the electric power generated by the photovoltaic cell is at a maximum during the time period when the electric current flowing through the battery is at a maximum during the time period, said converter means including a switch means for controlling when said converter means electrically connects the photovoltaic cell to the battery and when said converter means electrically disconnects the photovoltaic cell from the battery, wherein said switch means has a first state of operation and a second state of operation such that when said switch means is operating in its first state of operation the photovoltaic cell is electrically connected to the battery and when said switch means is operating in its second state of operation the photovoltaic cell is electrically disconnected from the battery;

peak current determining means coupled to the battery for determining when the electric current flowing through the battery is at a maximum and for generating an electric signal when the electric current flowing through the battery is at a maximum; and switch control means electrically connected to said switch means and to said peak current determining means for controlling when said switch means is operating in said first state of operation and when said switch means is operating in said second state of operation, wherein said switch control means is responsive to said electric signal generated by said peak current determining means.

41. The apparatus of claim 40, wherein said switch control means includes first electric voltage waveform generator means for generating a triangle electric voltage waveform during the time period, second electric voltage waveform generator means for generating a ramp-shaped electric voltage waveform during a first portion of the time period and a fixed voltage waveform during a second portion of the time period, and comparator means for comparing said electric voltage waveforms produced by said first and second electric voltage waveform generator means and for creating an electric voltage waveform having a varying duty cycle during said first portion of the time period and a fixed duty cycle during said second portion of the time period.

42. The apparatus of claim 41, wherein the total of said first and second portions of the time period is less than or equal to the time period.

43. The apparatus of claim 41, wherein said second electric voltage waveform generator means includes a counter means for producing a plurality of electric voltage signals digitally representing a binary number and a digital-to-analog converter means for converting said digitally represented binary number produced by said counter means on said plurality of electric voltage signals to a single voltage signal having an amplitude linearly related to said digitally represented binary number.

44. The apparatus of claim 43, wherein said second electric voltage waveform generator means further includes latching means electrically disposed between said counter means and said digital-to-analog converter means for allowing said plurality of electric voltage signals produced by said counter means to be input signals to said digital-to-analog converter means during said first portion of the time period, and for latching the input signals to said digital-to-analog converter means during said second portion of the time period.

45. The apparatus of claim 44, wherein said switch control means further includes a clock means for providing an electric signal to said latching means when said first portion of the time period has started.

46. The apparatus of claim 44, wherein said switch control means sends an electric signal to said peak current determining means when said first portion of the time period has started.

47. The apparatus of claim 41, wherein said peak current determining means includes a resistor in electrical series with the battery such that all of the electric current flowing through the battery also flows through said resistor.

48. The apparatus of claim 47, wherein said peak current determining means further includes a capacitor that is electrically discharged prior to said first portion of the time period and electrically charged during said first portion of the time period.

\* \* \* \* \*